United States Patent
Matei et al.

(10) Patent No.: US 10,558,204 B2
(45) Date of Patent: Feb. 11, 2020

(54) SYSTEM AND METHOD FOR SCALABLE REAL-TIME MICRO-OBJECT POSITION CONTROL WITH THE AID OF A DIGITAL COMPUTER

(71) Applicant: Palo Alto Research Center Incorporated, Palo Alto, CA (US)

(72) Inventors: Ion Matei, Sunnyvale, CA (US); Jeng Ping Lu, Fremont, CA (US); Saigopal Nelaturi, Mountain View, CA (US); Julie A. Bert, East Palo Alto, CA (US); Lara S. Crawford, Belmont, CA (US); Armin R. Volkel, Mountain View, CA (US); Eugene M. Chow, Palo Alto, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 186 days.

(21) Appl. No.: 15/469,433

(22) Filed: Mar. 24, 2017

(65) Prior Publication Data

US 2018/0081347 A1  Mar. 22, 2018

Related U.S. Application Data

(60) Provisional application No. 62/396,741, filed on Sep. 19, 2016.

(51) Int. Cl.
*G05D 3/14* (2006.01)
*G05B 19/418* (2006.01)
(Continued)

(52) U.S. Cl.
CPC ....... *G05B 19/41885* (2013.01); *G05B 17/02* (2013.01); *G06T 7/155* (2017.01);
(Continued)

(58) Field of Classification Search
CPC .......... G01N 15/1459; G01N 15/1463; G01N 2015/149; G01N 15/1484;
(Continued)

(56) References Cited

U.S. PATENT DOCUMENTS 5,858,192 A * 1/1999 Becker ................. B01J 19/0093
204/280
5,941,481 A * 8/1999 Snarski ..................... B63B 1/32
244/130
(Continued)

FOREIGN PATENT DOCUMENTS

EP        1450304 A1 *  8/2004  .............. G06T 7/73
WO   WO-03081527 A1 * 10/2003  .............. G06N 3/08

OTHER PUBLICATIONS

R. Probst et al. "Flow control of small objects on chip: Manipulating live cells, quantum dots, and nanowires," IEEE Control Systems, 32(2):26-53, Apr. 2012.
(Continued)

*Primary Examiner* — Darrin D Dunn
(74) *Attorney, Agent, or Firm* — Leonid Kisselev

(57) ABSTRACT

The system and method described below allow for real-time control over positioning of a micro-object. A movement of at least one micro-object suspended in a medium can be induced by a generation of one or more forces by electrodes proximate to the micro-object. Prior to inducing the movement, a simulation is used to develop a model describing a parameter of an interaction between each of the electrodes and the micro-object. A function describing the forces generated by an electrode and an extent of the movement induced due to the forces is generated using the model. The function is used to design closed loop policy control scheme for moving the micro-object towards a desired position. The
(Continued)

position of the micro-object is tracked and taken into account when generating control signals in the scheme.

18 Claims, 16 Drawing Sheets

(51) Int. Cl.
| | |
|---|---|
| *G05B 17/02* | (2006.01) |
| *G06T 7/194* | (2017.01) |
| *G06T 7/73* | (2017.01) |
| *G06T 7/155* | (2017.01) |
| *H04N 7/18* | (2006.01) |

(52) U.S. Cl.
CPC ............... *G06T 7/194* (2017.01); *G06T 7/74* (2017.01); *H04N 7/183* (2013.01); *G05B 2219/32359* (2013.01); *G06T 2207/20021* (2013.01); *G06T 2207/30164* (2013.01)

(58) Field of Classification Search
CPC ... G01N 2015/0003; G01N 2015/1075; G01N 2015/1409; G01N 2015/1415; B01L 3/502761; B01L 2200/0652; B01L 3/502792; B01L 2400/043; B01L 2300/089; B01L 2400/0406; B01L 2400/0415; B01L 2400/0421; B01L 3/50273; G06T 7/155; G06K 9/00536
See application file for complete search history.

(56) References Cited

U.S. PATENT DOCUMENTS

| | | | | |
|---|---|---|---|---|
| 6,311,262 | B1* | 10/2001 | Hachmann | G06F 15/7867 712/32 |
| 6,317,511 | B1* | 11/2001 | Horiuchi | G01N 15/1459 356/39 |
| 6,480,615 | B1* | 11/2002 | Sun | G06T 7/215 382/103 |
| 6,977,033 | B2* | 12/2005 | Becker | B01F 13/0076 204/450 |
| 7,010,391 | B2* | 3/2006 | Handique | B01F 13/0071 204/450 |
| 7,068,874 | B2* | 6/2006 | Wang | H05H 3/04 250/432 R |
| 7,332,361 | B2 | 2/2008 | Lu et al. | |
| 7,651,598 | B2* | 1/2010 | Shapiro | B03C 5/024 204/450 |
| 8,110,083 | B1* | 2/2012 | Shapiro | B03C 5/024 204/450 |
| 8,520,892 | B2* | 8/2013 | Kuleschow | G06T 7/136 382/103 |
| 8,532,336 | B2* | 9/2013 | Bobbitt | G06K 9/00771 382/103 |
| RE44,711 | E * | 1/2014 | Wu | B03C 5/026 204/547 |
| 8,723,104 | B2* | 5/2014 | Sun | G01N 15/1429 250/251 |
| 8,731,278 | B2* | 5/2014 | Cohen | G06K 9/00134 382/154 |
| 9,608,547 | B2* | 3/2017 | Ding | B07C 5/3427 |
| 9,795,966 | B2* | 10/2017 | Umbanhowar | B01L 3/502792 |
| 9,892,225 | B2* | 2/2018 | Tirapu Azpiroz | G06F 17/5068 |
| 9,996,920 | B2* | 6/2018 | Du | G01N 15/1434 |
| 10,018,552 | B2* | 7/2018 | Tanaka | G01N 15/00 |
| 2003/0010636 | A1* | 1/2003 | Birkbeck | B01D 57/02 204/547 |
| 2005/0051429 | A1* | 3/2005 | Shapiro | B03C 5/024 204/452 |
| 2008/0083621 | A1* | 4/2008 | Sideris | G01N 27/44713 204/450 |
| 2008/0177518 | A1* | 7/2008 | Krishnamoorthy | G06F 17/5009 703/9 |
| 2008/0279448 | A1* | 11/2008 | Schafer | G01N 15/1459 382/154 |
| 2009/0089024 | A1* | 4/2009 | Huang | G05B 19/41865 703/2 |
| 2009/0226033 | A1* | 9/2009 | Sefcik | G06K 9/3233 382/103 |
| 2009/0314644 | A1* | 12/2009 | Golan | B01F 13/0076 204/643 |
| 2010/0121577 | A1* | 5/2010 | Zhang | G06K 9/00798 701/301 |
| 2010/0329536 | A1* | 12/2010 | Muschler | G06K 9/0014 382/133 |
| 2012/0298512 | A1* | 11/2012 | Mezic | G01N 27/447 204/627 |
| 2013/0011210 | A1* | 1/2013 | Toner | B01D 21/0087 406/86 |
| 2013/0044940 | A1* | 2/2013 | Cohen | G06K 9/00134 382/154 |
| 2014/0073000 | A1* | 3/2014 | Sun | G01N 15/1429 435/34 |
| 2014/0151229 | A1* | 6/2014 | Molho | B03C 5/005 204/453 |
| 2015/0076961 | A1 | 3/2015 | Thompson et al. | |
| 2015/0339951 | A1* | 11/2015 | Stevens | G06K 9/00664 348/62 |
| 2016/0171686 | A1* | 6/2016 | Du | G01N 15/1434 382/130 |
| 2016/0351584 | A1 | 12/2016 | Lu et al. | |
| 2016/0356696 | A1* | 12/2016 | Lewis | G01N 15/1404 |
| 2016/0377525 | A1* | 12/2016 | Foster | B01L 3/502761 435/34 |
| 2017/0102016 | A1* | 4/2017 | Azpiroz | B01L 3/5027 |
| 2017/0214909 | A1* | 7/2017 | Subrahmanyam | G02B 27/2271 |
| 2017/0239659 | A1* | 8/2017 | Akella | B01L 3/502792 |
| 2017/0299494 | A1* | 10/2017 | Lin | G01N 15/1459 |
| 2018/0081347 | A1* | 3/2018 | Matei | G06T 7/194 |
| 2018/0117593 | A1* | 5/2018 | Toner | B01D 21/0087 |

OTHER PUBLICATIONS

Qian et al., "On-demand and location selective particle assembly via electrophoretic deposition for fabricating structures with particle-to-particle precision," Langmuir, 31(12):3563-3568, 2015, PMID: 25314133.

Tolley et al., "Dynamically programmable fluidic assembly." Applied Physics Letters, 93(25), 2008.

Zoran Zivkovic, "Improved adaptive gaussian mixture model for background subtraction," in Pattern Recognition, 2004. ICPR 2004.

* cited by examiner

SYSTEM AND METHOD FOR SCALABLE REAL-TIME MICRO-OBJECT POSITION CONTROL WITH THE AID OF A DIGITAL COMPUTER

CROSS-REFERENCE TO RELATED APPLICATION

This non-provisional patent application claims priority under 35 U.S.C. § 119(e) to U.S. Provisional Patent application, Ser. No. 62/396,741, filed Sep. 19, 2016, the disclosure of which is incorporated by reference.

This invention was made with government support under Contract No. FA8650-15-C-7544 awarded by the Defense Advanced Research Projects Agency. The government has certain rights in the invention.

FIELD

This application relates in general to micro-assembly control, and in particular, to a system and method for scalable real-time micro-object position control with the aid of a digital computer.

BACKGROUND

The degree to which control can be exercised over assembly of micro-objects, objects whose dimensions measure in microns, can make a significant difference in a number of technologies. For example, manufacturing of reconfigurable electrical circuits can be improved by being able to accurately control positioning of micro-objects such as capacitors and resistors to manufacture a circuit with a desired behavior. Similarly, production of photovoltaic solar cell arrays can benefit from being able to put photovoltaic cells with certain qualities into particular positions on the arrays. Such cells can be too small to allow for a desired placement of the cells via human or robotic manipulation, and another kind of transportation mechanism is needed. Micro-assembly of particles can also be used to engineer the microstructure of materials. Biological cells being assembled into tissue need to be positioned and oriented. Achieving rapid directed assembly of micro objects to desired positions and with desired orientations is generally needed. Many other technological fields exist where increasing control over assembly of micro-objects can provide significant benefits.

Existing methods do not allow for control of movement of micro-objects with the required degree of precision. For example, uncontrolled mechanical agitation is typically used for directed particle assembly. However, this technique fails to achieve the near 100% yield necessary for certain industrial applications, such as electronics assembly.

Previous work has also attempted to use an electric field to direct movement of micro-objects. For example, Edwards et al., "Controlling Colloid Particles With An Electric Field," discusses control of colloid particle ensembles (1 μm to 3 μm in diameter) and individual colloids using inhomogeneous electric fields. In particular, the individual colloid particles and the ensembles of the colloid particles suspended in water and sodium hydroxide solutions are manipulated through electrophoresis and electroosmosis using two parallel electrodes. The manipulation is done with the assumption that the electric field is completely dictated by the two parallel electrodes and is not disturbed by presence of the particles. Optical-based feedback control is used to monitor assembly and disassembly of colloid crystals. The feedback control focuses on groups of particles, thus not being able to put a particular particle in a desired position. However, the relative size of the colloids to the electrodes employed to generate the field, the medium in which the particles were immersed, and the resulting mathematical models, do not allow the described techniques to be used in certain industrial applications. In particular, the described techniques are not suitable for assembling micro-objects even slightly larger than those discussed in the Edwards paper. Further, the control schemes used involve high frequency signals (MHz), which further limits the applicability of such techniques.

Other works, such as Xue et al., "Optimal design of a colloidal self-assembly process." *IEEE Transactions on Control Systems Technology,* 22(5):1956-1963, September 2014, and Xue et al., "Mdp based optimal control for a colloidal self-assembly system" *American Control Conference (ACC),* 2013, pages 3397-3402, June 2013, discuss using a Markov-Decision Process optimal control policy to control a stochastic colloidal assembly and drive the system to a desired high-crystallinity state. Actuator-parametrized Langevin equations are used to describe the system dynamics. However, the described approach does not allow direct manipulation of individual particles. As individual particle control is even more difficult when assembling electrical circuits, whether the described techniques can be used for electrical circuit assembly remains unclear. In addition, the particle size (≈3 μm in diameter) described in these works poses little disturbance to the electric field that is completely shaped by an actuation potentials. Moreover, the time scale for achieving the desired state would make the goal of high throughput challenging to achieve when the described techniques are applied.

Still other works, such as Qian et al., "On-demand and location selective particle assembly via electrophoretic deposition for fabricating structures with particle-to-particle precision," *Langmuir,* 31(12):3563-3568, 2015, PMID: 25314133, have demonstrated single particle precision and location selective particle deposition, with electrophoretic forces being the primary drive for particle (2 μm polystyrene beads) manipulation. Shaping the energy landscape by building large energy wells closed to the desired location of the nano-particles was the chosen approach for controlling the formation of nano-structures. Although an important part in fabricating structures, the described techniques have limited industrial applications as particle deposition would not suffice for achieving potentially complex structures that may appear in electrical circuits. In addition this approach is not compatible with a subsequent transfer of the assembly to a final substrate, which is generally needed for the assembly to be used in most applications.

Still other techniques for control of assembly of microscopic particles have been proposed. For example, R. Probst et al. "Flow control of small objects on chip: Manipulating live cells, quantum dots, and nanowires," *IEEE Control Systems,* 32(2):26-53, April 2012, describes using electric field induced electroosmotic flow actuation to precisely manipulate cells, quantum dots and nano-wires. Linear models in the electrode potentials for the particle motion are obtained and are used to design control schemes using least square methods. In addition, the particles' effect on the electric field distribution is negligible. Thus, this model is inapplicable where the linearity no longer holds and electrode potentials are where the electric field is affected by the particle position. Another approach is described in U.S. Pat. Nos. 7,651,598 and 8,110,083, issued to Shapiro et al. focuses on fluid flow actuation to control fluid flow fields to move particles. The main mechanism for particle transport described by Shapiro et al. is electroosmoisis. This mechanism results in a linear control scheme in the voltages applied to the electrodes. In addition, the Shapiro approach for generating control commands involves inverting a matrix, an operation which does not scale with the size of electrodes and may not be practical when a large number of electrodes is involved.

Still other techniques have been proposed. For example, since both electrophoretic forces as well as fluid motions of electro-osmotic flows can be used to drive particles, water based solution in which particles are immersed is a popular choice that have been explored in works such as Tolley et al., "Dynamically programmable fluidic assembly." *Applied Physics Letters*, 93(25), 2008. However, these models are applicable to particles that are spherical, and may not be suitable for controlling particles of other shapes and thus have limited industrial applicability.

Accordingly, there is a need for a way to control movement of micro-objects with a degree of precision and scalability sufficient for industrial applications.

SUMMARY

The system and method described below allow for real-time control over positioning of a micro-object. A movement of at least one micro-object suspended in a fluid, such as a dielectric medium, can be induced by a generation of a group of forces, such as a voltage induced electrostatic force through electrodes proximate to the micro-object. Prior to inducing the movement, a simulation is used to develop a model describing a parameter of an interaction between the electrodes and the micro-object (such as the capacitance). A base function describing a voltage generated by an electrode and an extent of the movement induced due to the voltage is generated using the model. The base function is used to design a closed loop policy control scheme for moving the micro-object towards a desired position. The position of the micro-object is tracked and taken into account when generating control signals in the scheme.

Due to performing the modeling and base function derivation prior to generating the control scheme, the computational effort to generate the scheme in real-time decreases to make the real-time control of the micro-object position scalable for industrial applications. The described system and method can also be scaled to simultaneously control positions of multiple micro-objects.

In one embodiment, a system and method for scalable real-time micro-object position control with the aid of a digital computer are provided. One or more parameters of a system for positioning of at least one micro-object are obtained, the system comprising a plurality of electrodes, the electrodes configured to induce a movement of the micro-object when that micro-object is suspended in a fluid proximate to the electrodes upon a generation of one or more forces by the electrodes. A parameter of an interaction between each of the electrodes and the micro-object is modeled as a function of a distance between that electrode and the micro-object. A position of the micro-object within the fluid is obtained. A control signal is generated for each of the electrodes, the control signal comprising a command to generate one or more of the forces for the predefined period of time by that electrode, using the obtained position, the interaction parameter function, and a desired location of the micro-object.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Real-time control over movements of a micro-object can be accomplished by combining real-time micro-object position tracking and use of a lumped, capacitance-based motion model to predict voltages generated by electrodes proximate to the micro-object necessary to move the micro-object towards a desired position. The tracking provides real-time feedback that can be used to correct the position of the micro-object. While the system and method below are described with reference to controlling position of a single micro-object, the system and method can also be used to simultaneously control the positions of multiple micro-objects. Further, while the interaction between the electrodes and the micro-object below is described in terms of electric forces, the system and method described below can use other forces besides electric forces, such as magnetic forces, in which case inductances would be an appropriate parameter to simulate. Chemical potentials and other driving forces with predictable spatial dependencies can also be used.

Figure 1:
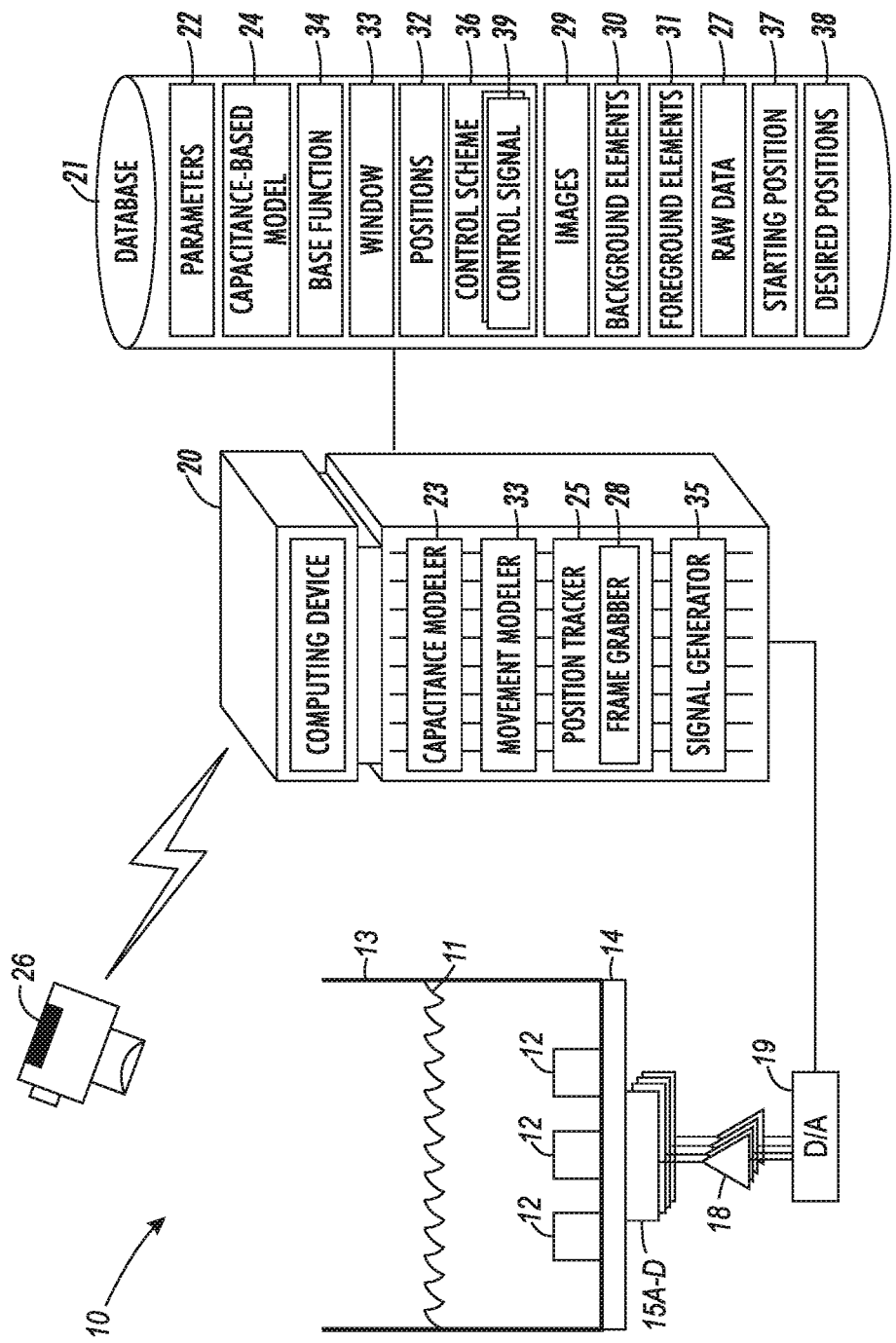
FIG. 1 is a block diagram showing a system for scalable real-time micro-object position control with the aid of a digital computer.

FIG. 1 is a block diagram showing a system 10 for scalable real-time micro-object position control with the aid of a digital computer. The system 10 includes a dielectric fluid 11 in which are immersed one or more micro-objects 12. The dielectric fluid 11 can be contained by an enclosure 13 on the sides and a layer of film 14 on the bottom. In one embodiment, the dielectric fluid 11 can be Isopar® M, manufactured by ExxonMobil Chemical Company of Spring, Tex. doped with di-2-ethylhexylsulfosuccinate (AOT) charge director molecules, though other dielectric fluids 11 are also possible. In one embodiment, the film 14 can be a 50 μm thick perfluroalkoxy (PFA) film, though other kinds of film 14 of other thicknesses are possible. A micro-object 12 can be any object whose dimensions measure in microns. In one embodiment, the micro-objects 12 can be non-spherical silicon chiplets of 300 μm×200 μm×50 μm dimensions; such chiplets are of a rectangular shape. In another application, for engineered microstructure for optical metamaterials, the micro-objects could be particles 0.2 um in diameter. Unless otherwise indicated, these 200 um silicon chiplet of micro-objects 12 were used to obtain the experimental data below. Other kinds of micro-objects 12 of varying dimensions and shapes, including those of a spherical shape, can also be controlled using the system 10.

Figure 2:
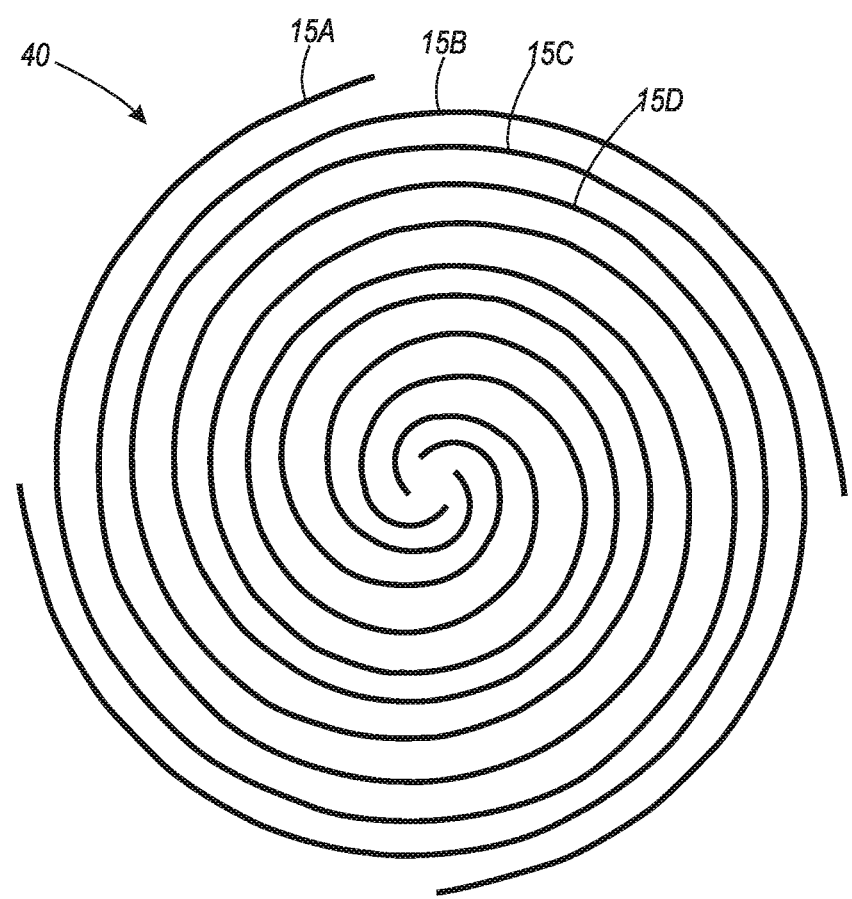
FIG. 2 is a diagram showing a spiral electrode unit that includes four spiral electrodes of FIG. 1, in accordance with one embodiment.

The film 14 is laminated on a plurality of electrodes 15A-15D that generate voltages when electric potentials are applied to these electrodes 15A-15D. In one embodiment, the electrodes 15A-15D are spiral electrodes and are arranged into a spiral electrode unit. FIG. 2 is a diagram showing a spiral electrode unit 40 that includes four spiral electrodes 15A-15D of FIG. 1, in accordance with one embodiment. Electrodes 15-A-15D can each be independently driven with different voltages having different patterns, amplitudes, frequency and phase. As can be seen with reference to FIG. 2, the sequence of electrodes 15A-15D repeats periodically starting from the outside and moving towards the center of the unit 40. The radial spacing between electrodes 15A-15D is 100 μm. In one embodiment, the width of the electrodes is 100 μm, and the radial distance between the electrodes 15A-15D can be 100 μm; in a further embodiment, other radial distances and widths of the electrodes 15A-15D are possible. The electrostatic potentials created by these electrodes 15, while limited in spatial freedom, are rich in temporal freedom and the spiral arrangement of the electrodes can be used to induce a radial motion of the micro-objects 12 (away or towards the center of the spiral).

Figure 3:
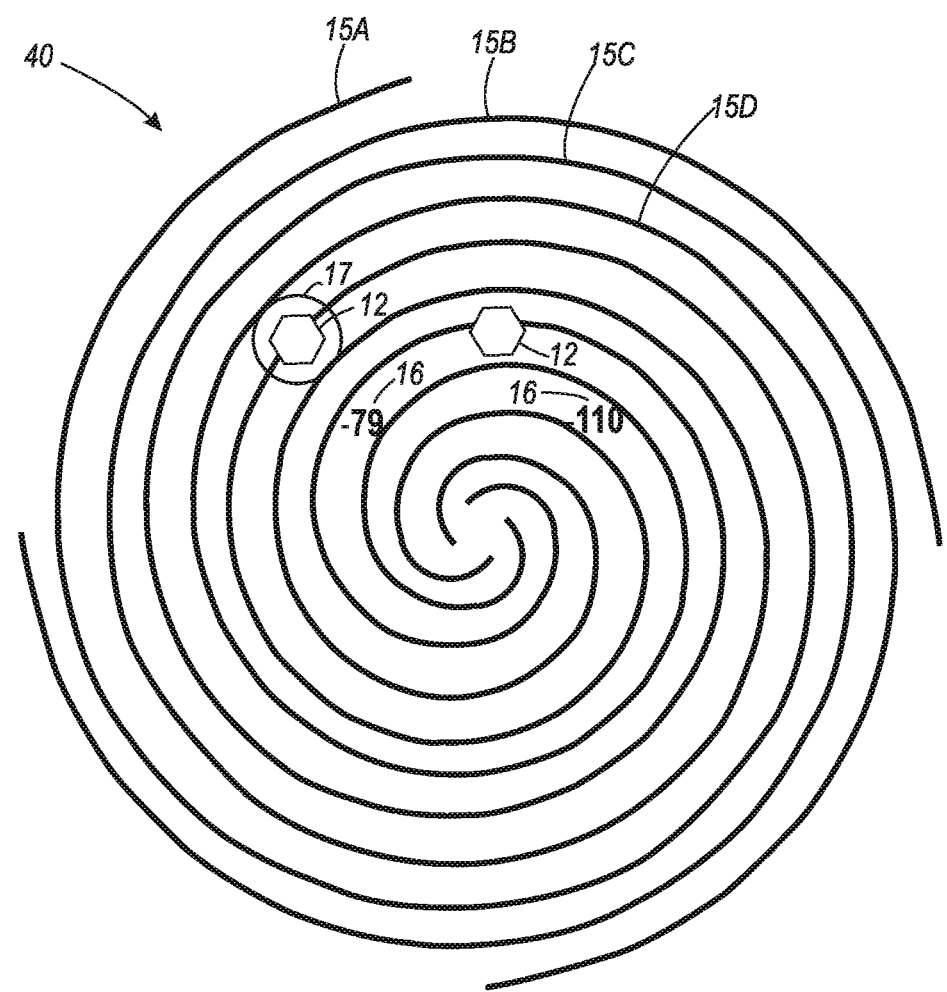
FIG. 3 is a diagram showing, by way of example, positions of two micro-objects on the spiral unit of FIG. 2.

As described further below, a generation of voltages by the electrodes 15A-15D can induce a change in positions of micro-objects 12 by changing the force between the micro-object and the electrode. FIG. 3 is a diagram showing, by way of example, positions of two hexagonal micro-objects 12 on the spiral unit 40 of FIG. 2. As further described below, the movement of the micro-objects 12 in the relation to the electrodes 15A-15D in the response to the generation of the electric field by the electrodes 15A-15D can be tracked. Coordinates 16 of the micro-objects 12, such as the micro-object 12 circled 17 in FIG. 3, can be calculated based on a micro-object's 12 position in relation to the electrodes 15, and the magnitude of the micro-object's 12 movement can be calculated based on a difference in the coordinates 16 before and after a generation of an electric fields. The coordinates correspond to the center of the identified micro-object 12.

While electrodes 15A-15D described with reference to FIGS. 2 and 3 are spiral, the electrodes 15A-15D can be of other shapes and combined into other configurations. The number of the electrodes 15A-15D in the array can be a number other than four. For example, in a further embodiment, non-spiral electrodes 15A-15D can be arranged in a two dimensional array that is used to control movements of electrodes. In a still further embodiment, the electrodes could also be arranged in a two dimensional grid pattern.

Depending on the system 10, varying numbers of additional electrodes 15A-15D could be included into the system 10, and thus varying force control patterns could be applied, as each of these electrodes could be independently controlled. So while the above spiral electrodes 15A-15D have 4 separate control signals, a generalized array of many electrodes, the numbers of electrodes reaching millions in one embodiment, similar to a display backplane, could be used to generate pixelated electrode patterns; approximating the spirals or other patterns. US Patent Application Publication No. 20160351584, entitled "Active Matrix Backplane Formed Using Thin Film Optocouplers," published Dec. 1, 2016, the disclosure of which is incorporated by reference, describes a device for generating these force patterns with electrode arrays. U.S. Pat. No. 7,332,361 "Xerographic Micro-assembler," issued Feb. 19, 2008, to Lu, the disclosure of which is incorporated by reference, describes a system for integrating such an assembler array into a printer system with integrated transfer to a final substrate. Still other electrode configurations are possible.

Returning to FIG. 1, the electrodes 15A-15D are driven by amplifiers 18, which are in-turn controlled by a digital-to-analog converter 19. The digital-to-analog converter 19 is interfaced to at least one computing device 20 and under the control of the computing device 20, directs the electrodes 15A-15D to generate specific voltages for specific periods of time through the amplifiers 18 when commanded by the computing device 20 interfaced to converter 19.

The computing device 20 is interfaced to a database 21 that stores parameters 22 of the system 10 that are relevant to the generation of the voltage and inducing movement of the micro-objects 12. Such parameters 22 can include the dimensions and shape (such as spiral or non-spiral shape) of the electrodes 15; the material of which the electrodes 15, the film 14, the micro-objects, and the dielectric fluid 11, are made; a thickness of the film 14; an intensity of the drag on the micro-object 12 against the film 14; the dimension of the micro-object 12; and the voltage that the electrodes 15A-15D are capable of generating, though other parameters 22 are also possible.

Before exercising control over the electrodes 15A-15D, the computing device 20 executes a capacitance modeler 23 that uses the parameters 22 to create a capacitance-based model 24 of the interaction between the electric fields generated by the electrodes 15A-15D and the micro-objects 12. While the model 24 is described in relation to a single micro-object 12, the model 24 can also be extended to cover multiple micro-objects 12. In a further embodiment, the modeler 23 can model a parameter of the interaction between the electrodes 15A-15D and the micro-object 12 other than capacitance.

When the electrodes 15A-15D generate a voltage, dielectrophoretic and electrophoretic forces are also generated by the electrodes 15A-15D. The projections of the dielectrophoretic and electrophoretic forces on a micro-object 12 in the x and y directions are denoted in the model 24 by $F_x(x_c, y_c)$ and $F_y(x_c, y_c)$, respectively, where $(x_c, y_c)$ represents the position of the center of the micro-object's 12 in two dimensions (the subscript of the coordinates refer to the center of the particle). A viscous drag force proportional to the velocity of the movement of the micro-object 12 opposes the micro-object's 12 motion and is taken into account in the model 23. Due to the negligible mass of the micro-object 12, acceleration is ignored in creating the model 24. As experimentally shown, the micro-objects 12 touch the surface of the film 14 when while being moved. Hence, the micro-object 12 remains at a constant height in the model 24; in the embodiment of the model 24 described below, the thickness of the film 14 is 50 μm, $y_c$ is set to be 50 μm, and the model 24 includes an additional stiction force due to the micro-object 12 contact with the film 14 surface. The model 24 assumes the stiction force to be proportional to $F_y(x_c, y_c)$, when the $F_y(x_c, y_c)$, points downwards (and the micro-object 12 is pulled towards the contact surface). Thus, the forces acting on the micro-object 12 that the model 24 accounts for are summarized in the following motion equations corresponding to the x-direction:

$$\mu \dot{x}_c = F_x(x_c) - \gamma(t) F_y(x_c), \tag{1}$$

where $$\gamma(t) = \begin{cases} \gamma_0 \text{sign}(\dot{x}_c) |F_y(x_c)| & F_y(x_c) \le 0 \\ 0 & F_y(x_c) > 0 \end{cases}$$

where μ is the viscous friction coefficient and $\dot{x}_c$ is the velocity of the micro-object in the x-direction. As the micro-object 12 remains roughly at a constant height, the model 24 does not consider vertical movement and thus no equation for the y direction is included. The intensity of the stiction force is controlled by the variable γ(t) whose definition reflects the additional surface drag only when $F_y(x_c)$ is negative (the micro-object 12 is pushed downwards towards the film 14). The parameter $\gamma_0$, included as part of the parameters 22, models the intensity of the drag and is determined experimentally prior to using the system 10. $\gamma_0$ must be such that the total force can take positive values (assuming positive speed); otherwise, the micro-object 12 would never move.

The description of the model 24 references the electrodes 15A-15D of the unit 40, described above with reference to FIG. 2, however the model can also be adapted to represent other kinds of electrode units with different numbers of electrodes 15A-15D.

Figure 4:
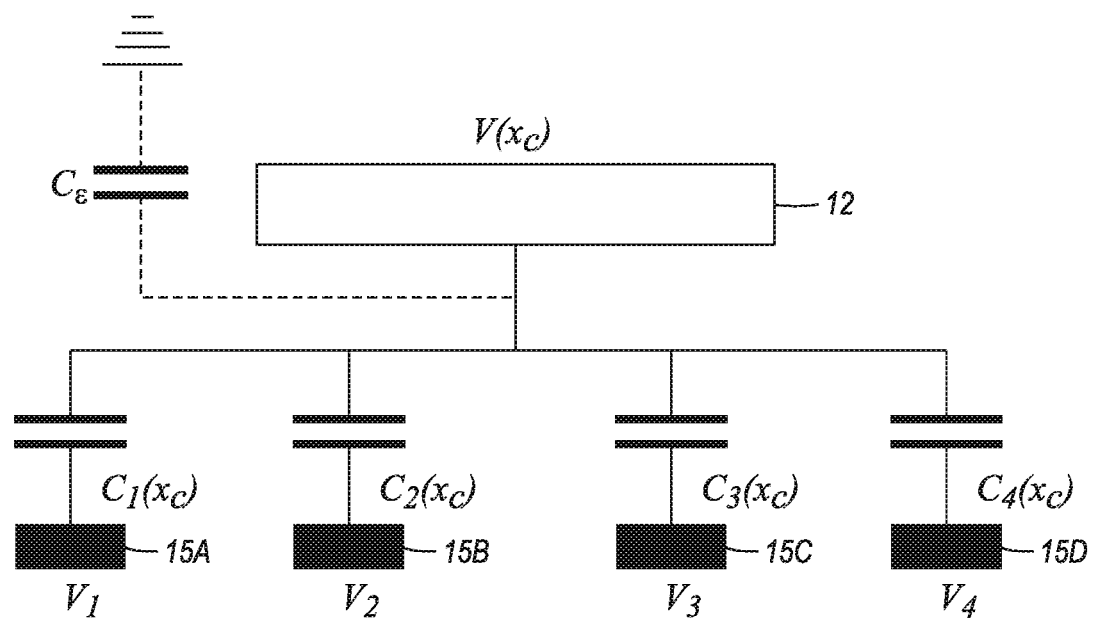
FIG. 4 is a diagram showing a representation of four electrodes and the micro-objects as forming a capacitance electrical circuit.

In the model 24, the forces $F_x(x_c)$ and $F_y(x_c)$ are expressed using the potential energy of the micro-object 12. The potential energy is computed by representing the electrodes 15A-15D and the micro-objects 12 as forming a capacitive-based electrical circuit. FIG. 4 is a diagram 50 showing a representation of four electrodes 15A-15D and the micro-objects as forming a capacitance electrical circuit. The rationale for such representation comes from the charge being induced on the micro-object 12 due to the dielectric properties of the dielectric fluid 11. This phenomenon is similar to the behavior of a capacitor when a potential difference is applied to the capacitor. In addition, the micro-object 12 and the electrodes 15A-15D act as metal plates; hence, the capacitances of these capacitors are dependent on the micro-object 12 position. As expected, the maximum capacitance values are attained when the micro-object's 12 position maximizes overlap with the electrodes. A small "leakage" capacitor $C_\varepsilon$ is included to account for all the stray capacitance to the environment.

Let $\{V_i\}_{i=1}^N$ be the electric potentials to the ground at the four electrodes 15A-15D. By representing the ground as the N+1 potential ($V_{N+1}=0$) and the leakage capacitor as the N+1 capacitor, the potential energy of the micro-object 12 is given by $$U(x_c, y_c) = \frac{1}{2} \sum_{i=1}^{N+1} C_i(\bar{x}_i, \bar{y}_i)[V_i - V_c(x_c, y_c)]^2 + qV_c(x_c, y_c) \tag{2}$$

where q is the charge of the micro-object 12, $\bar{x}_i = x_c - x_i$, $\bar{y}_i = y_c - y_i$, with $(x_i, y_i)$ being the coordinates of an electrode 15A-15D denoted as i. The first term reflects the dielectrophoretic effect while the second term describes the electrophoresis. As empirically observed, the charge of the micro-object 12 is negligible for the majority of experimental conditions. Hence, the description of the model 24 below focuses exclusively on dielectrophoresis as a modality to move the micro-object 12. At steady state, the micro-object 12's potential at a given position can be expressed as $$V_c(x_c, y_c) = \frac{1}{\Phi(x_c, y_c)} \sum_{j=1}^{N} C_j(\bar{x}_i, \bar{y}_i) V_j, \tag{3}$$

where $\Phi(x_c, y_c) = \Sigma_j C_j(\bar{x}_i, \bar{y}_i)$. The N+1 term does not appear due to the zero potential. A closed form expression for the potential energy follows:

$$U(x_c, y_c) = \frac{1}{2\Phi(x_c, y_c)} \sum_{i>j} C_i(\bar{x}_i, \bar{y}_i) C_j(\bar{x}_i, \bar{y}_i)(V_i - V_j)^2 \tag{4}$$

The dielectrophoretic forces acting on the micro-object 12 are computed by taking the gradient of the potential energy with respect to x and y directions. Thus, the micro-object's 12 velocity along the x-direction can be expressed as $$\dot{x}_c = V^T \Xi(x_c) V, \tag{5}$$

where $V = [V_{1,2}, \ldots, V_{1,N}, V_{2,3}, \ldots, V_{2,N}, \ldots, V_{N-1,N}]$, with $V_{i,j} = V_i - V_j$, and $\Xi(x_c)$ a diagonal matrix whose (i,j), (i,j) entry ((i,j) is seen as an index for a row or column) is given by $$\Xi(x_c)_{(i,j),(i,j)} = -\frac{1}{2\mu\Phi^2} \frac{d\Phi}{dx} C_i C_j + \frac{1}{2\mu\Phi}\left(\frac{dC_i}{dx} C_j + \frac{dC_j}{dx} C_i\right) + \tag{6}$$
$$\frac{\gamma}{2\mu\Phi^2} \frac{d\Phi}{dy} C_i C_j - \frac{\gamma}{2\mu\Phi}\left(\frac{dC_i}{dy} C_j + \frac{dC_j}{dy} C_i\right).$$

Several additional simplifications can be performed by recalling that the spiral electrode pattern of the electrode unit 40 has four periodic electrodes ($V_{i,j} = V_i - V_j$, where $V_{4k+i} = v_i$ and $v_i$ is the potential of line $i \in \{1, 2, 3, 4\}$), and by representing the potential differences explicitly in terms of the four electrode lines potentials $v_i$.

The simplified micro-object 12 dynamics, quadratic in the electrodes potentials to the ground can be expressed as:

$$\dot{x} = v^T \tilde{\Xi}(x_c) v, \quad (7)$$

where $v = [v_1, v_2, v_3, v_4]$ and $\tilde{\Xi}(x_c) = M^T \Xi(x_c) M$. The matrix M maps v to the vector of potential differences $u = (v_{i,j}, 1 \leq i < j \leq 4)$. For example the first row of matrix M is [1, −1, 0, 0, 0, 0] so that the first entry of the vector u=Mv is $v_{1,2} = v_1 - v_2$. To make the model 24 useful for control design, the representations for the capacitances between the electrodes and micro-object 12 are found in terms of the micro-object 12 position.

The capacitance modeler 23 estimates the capacitances and their partial derivatives by performing simulations, wherein the simulation data is used to fit parametric models for the capacitances and their partial derivatives. In one embodiment, the modeler 23 can include a commercially available software, such as COMSOL Multiphysics®, produced by Comsol® AB Corporation of Stockholm, Sweden, and the capacitances and their partial derivatives by simulating a 2-dimensional electrostatic COMSOL model. In the COMSOL® model, two metal plates with dimensions given by the geometry of the micro-object 12 and electrodes 15A-15D are surrounded by a dielectric with the same properties as the dielectric fluid 11. The quasi-static models are computed in the form of electromagnetic simulations using partial differential equations where the modeler 23 uses ground boundary (zero potential) as the boundary condition of the models design. The capacitance matrix entries are computed from the charges that result on each conductor when an electric potential is applied to one of them and the other is set to ground. This matrix maps the vector of potentials to the vector of charges. The COMSOL® simulations do reflect the field distortion when the micro-object 12 approaches the electrode. In a further embodiment, other simulation software could be used instead of the COMSOL® software.

Figure 5:
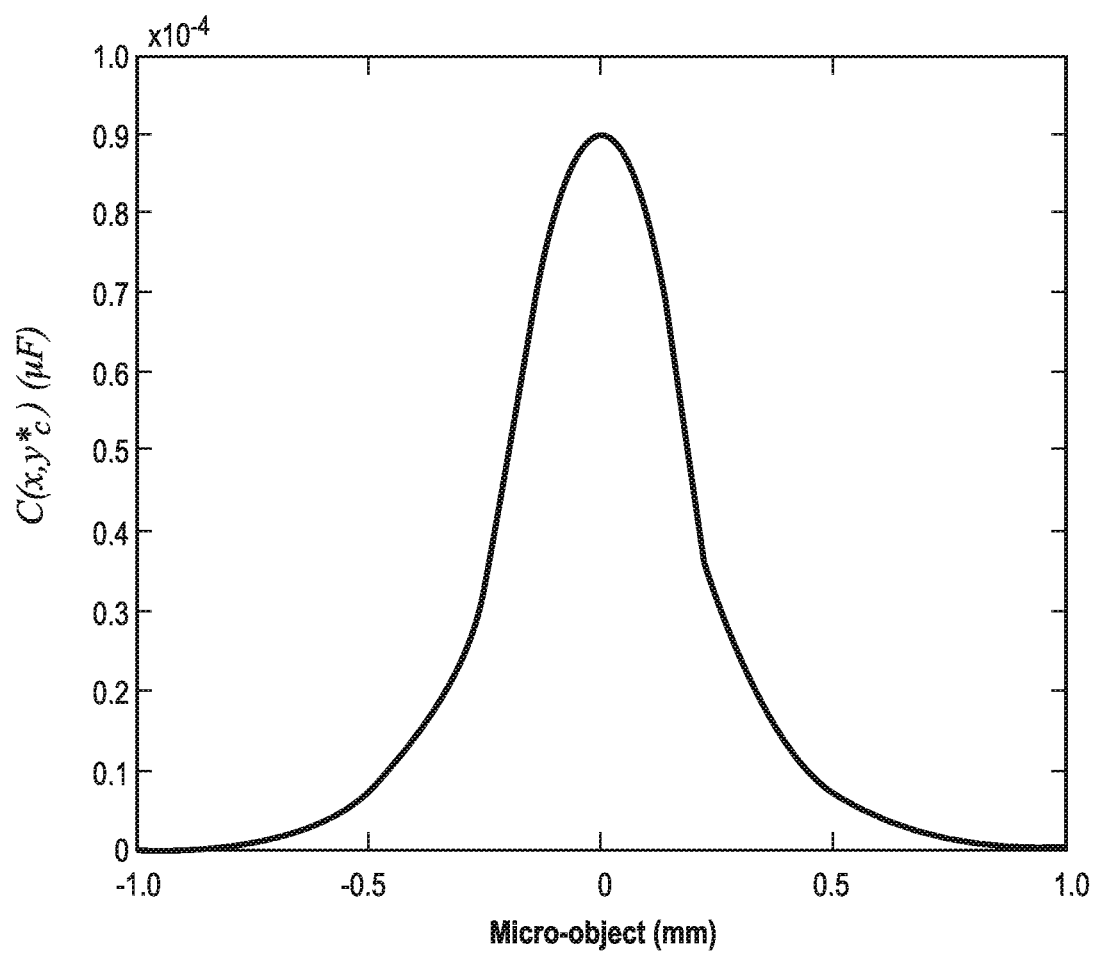
FIG. 5 is a diagram depicting, by way of example, C(x,y), the capacitance between the micro-object and the electrodes as a function of micro-object horizontal position, with y constant, where the simulated numerical values given were fitted on a continuously differentiable function.

The capacitance modeler 23 can perform the simulations for a range of micro-object 12 positions. In one embodiment, the evaluated positions can be $x_c \in [-1 \text{ mm}, 1 \text{ mm}]$ and $y_c \in \{50 \text{ µm} - \delta, 50 \text{ µm}, 50 \text{ µm} + \delta\}$ with $\delta = 1e-3$ µm, though other positions can also be evaluated. After evaluating the capacitance at the different positions, the capacitance modeler 23 can build a function included in the model 24 showing a relationship of between the position of the micro-object 12 and the electrodes 15A-15D. FIG. 5 is a diagram depicting, by way of example, C(x,y), the capacitance between the micro-object 12 and the electrodes 15A-15D as a function micro-object 12 horizontal position, with y constant, where the simulated numerical values given were fitted on a continuously differentiable function. The partial derivatives of C(x,y) with respect to x and y were determined by explicitly computing the partial derivative with respect to x, and by numerical approximations, respectively $$\left( \frac{\partial C(x,y)}{\partial y} \right)_{y=y_c^*} = \frac{C(x, y_c^* + \delta) - C(x, y_c^* - \delta)}{2\delta}.$$

The diagram of FIG. 5 was generated using the simulations of the COMSOL Multiphysics® software, the fit of the simulated numerical calculations on the continuously differentiable function given by $C(x, y_c^*) = 0.26031e-10[\text{erf}(-4522x+21.71) + \text{erf}(495.8x-3.432) + \text{erf}(-167.6x+0.6708) + \text{erf}(3121x+0.8186) + \text{erf}(-3119x+0.8176) + \text{erf}(167.4x-0.6707) + \text{erf}(11120x+1.86) + \text{erf}(-11120x+1.86)]$ for $x \in [-2 \text{ mm}, 2 \text{ mm}]$ and zero otherwise.

To determine a reasonable approximation for µ, a term included in the equations (1) and (6) above, the modeler 23 uses the principle of "equivalent spherical diameter" and Stoke's law for the viscous drag on a sphere. Based on the dimensions of the micro-object 12, the radius of a sphere that ensures the same volume is $R = 8.9470e-05$ m. According to Stoke's Law, the viscous drag for a sphere is $F_S = 6\eta \pi R v = \mu v$, with v the sphere velocity, and $\eta = 2.06$ mPa·s, the coefficient of viscosity. Hence, $\mu \approx 3.4741e-06$ N·s·m$^{-1}$. In the embodiment where the dielectric fluid is Isopar® M, given the density of Isopar® M ($\rho = 788$ Kg·m$^{-3}$) and the magnitude of the velocity, the Reynolds number is relatively small, and therefore the modeler 23 uses Stoke's Law to model the viscous drag force.

Thus, the model 24 takes into account the parameters 22 of the system and accounts for the dependence of the capacitance between the micro-object 12 and the electrodes 15, which can be used, as described below to determine a requisite amount of voltage that needs to be generated by the electrodes to move the micro-object 12 towards a desired position. In a further embodiment, a different capacitance-based model describing the relationship between the capacitance between the electrodes 15A-15D and a micro-object 12 and the distance between the electrodes 15A-15D and the micro-object 12 could be used to determine the requisite amount of voltage.

Returning to FIG. 1, the computing device 20 further executes a position tracker 25 that can track the position of the micro-objects 12. The computing device 20 is interfaced, via a wired or wireless connection, to a high speed, high resolution camera 26 that performs the visual monitoring of the electrodes 15A-15D and the micro-objects 12 on the electrodes 15A-15D before and after movement of a micro-object 12 due to the generation of the voltages by the electrodes 15A-15D. Raw data 27 representing the monitored electrodes 15A-15D and the micro-objects 12 that is captured by the camera 26 at particular points of time is provided to the position tracker 25, and a frame grabber 28 included in the position tracker 25 converts the raw data 27 into an image 29, and analyzes the image 29, as further described below. In one embodiment, the images 29 can be grayscale images; in a further embodiment, the images 29 can be color images. In one embodiment, the images can have a 1696×1704 resolution at 543 frames per second, though other characteristics of the images 29 are also possible. The position tracker 25 utilizes two properties of the electrodes 15A-15D and the micro-objects 12 for the analysis: that the electrodes 15A-15D are static and therefore may be considered the background of each of the images 29 (the images 29 also designated $f_k$ in the description below) and that the difference in micro-objects positions at consecutive time steps is bounded by a small value ε, i.e., $\|p_{k+1}, p_k\| < \varepsilon$.

The position tracker 25 runs a background extraction algorithm to identify background components 30 in an image 29 representing data captured before an initial movement of the micro-object 12. Classical background subtraction algorithms such as those described by Stauffer et al., "Adaptive background mixture models for real-time tracking." In *Computer Vision and Pattern Recognition*, 1999. *IEEE Computer Society Conference on.*, volume 2. IEEE, 1999, and Zoran Zivkovic, "Improved adaptive gaussian mixture model for background subtraction," in *Pattern Recognition*, 2004. *ICPR* 2004. *Proceedings of the 17th International Conference on*, volume 2, pages 28-31. IEEE, 2004, the disclosures of which are incorporated by reference, have several drawbacks. Such algorithms are based on classifying every pixel in each frame against a collection of weighted probability distributions where the weights are sorted in decreasing likelihood of modeling the background. Using this approach, given a pixel value in $f_k$, the pixel is classified as a background pixel if the pixel is close to a distribution (measured by the Mahalanobis distance) that is likely to model a background intensity. Updating the weights, means, and variances in the mixture model for each distribution at each pixel in $f_k$ results in a dynamic model of the background so that when micro-objects become stationary after reaching their desired location, they are gradually absorbed into the background. These algorithms largely succeed or fail based on the choice of weights, thresholds, and distribution parameters. These algorithm parameters may also stabilize too slowly given a poor initial mixture model. Despite stable parameters the background subtraction is unlikely to result in a clean segmentation of a micro-object 12 from background. More importantly, impurities in the dielectric fluid 11 due to setup errors, atmospheric exposure, and dirt may be as large as a few hundred microns and challenging to clean. Such impurities are also sensitive to the applied electric field and will be perturbed, causing them to be classified as part of the foreground.

Accordingly, the position tracker 25 uses background extraction algorithm in combination with other processing techniques to monitor the movement of the micro-objects 12. In particular, before voltage is generated by the electrodes 15A-15D to move a particular micro-object 12, the position tracker 25 runs at least one background subtraction algorithm, such as one referenced in the Stauffer and Zincovic papers cited above, for several images 29 to stabilize parameters the mixture model for each distribution at each pixel in $f_k$ results in a dynamic model of the background. Once the voltages are generated by the electrodes 15A-15D and a micro-object 12 is moved due the generated field, the position tracker 25 determines the position of the micro-object 12, as also described below with reference to FIG. 12. In particular, the position tracker 25 identifies moving and non-moving parts of the images 29 (using comparison to the images 29 derived from raw data 27 before and after the movement), with the non-moving components being background components 30 and the moving components being foreground components 31. For the first few frames showing moving foreground objects, the position tracker 25 uses a morphological opening (which is an erosion followed by a dilation) of $f_k$ with a disk whose diameter is the diameter of the maximal inscribed circle within the moved micro-object 12. In one embodiment, the morphological opening of a shape X with a disk D is the set (X! D)⊕D where ! and ⊕ represent the Minkowski difference and sum respectively, though other shapes of the morphological opening are possible. The application of the morphological opening is done to eliminate shapes and impurities that are smaller than the micro-object 12 size from the images 29. Groups of remaining connected foreground components then correspond to micro-objects 12.

Figure 6:
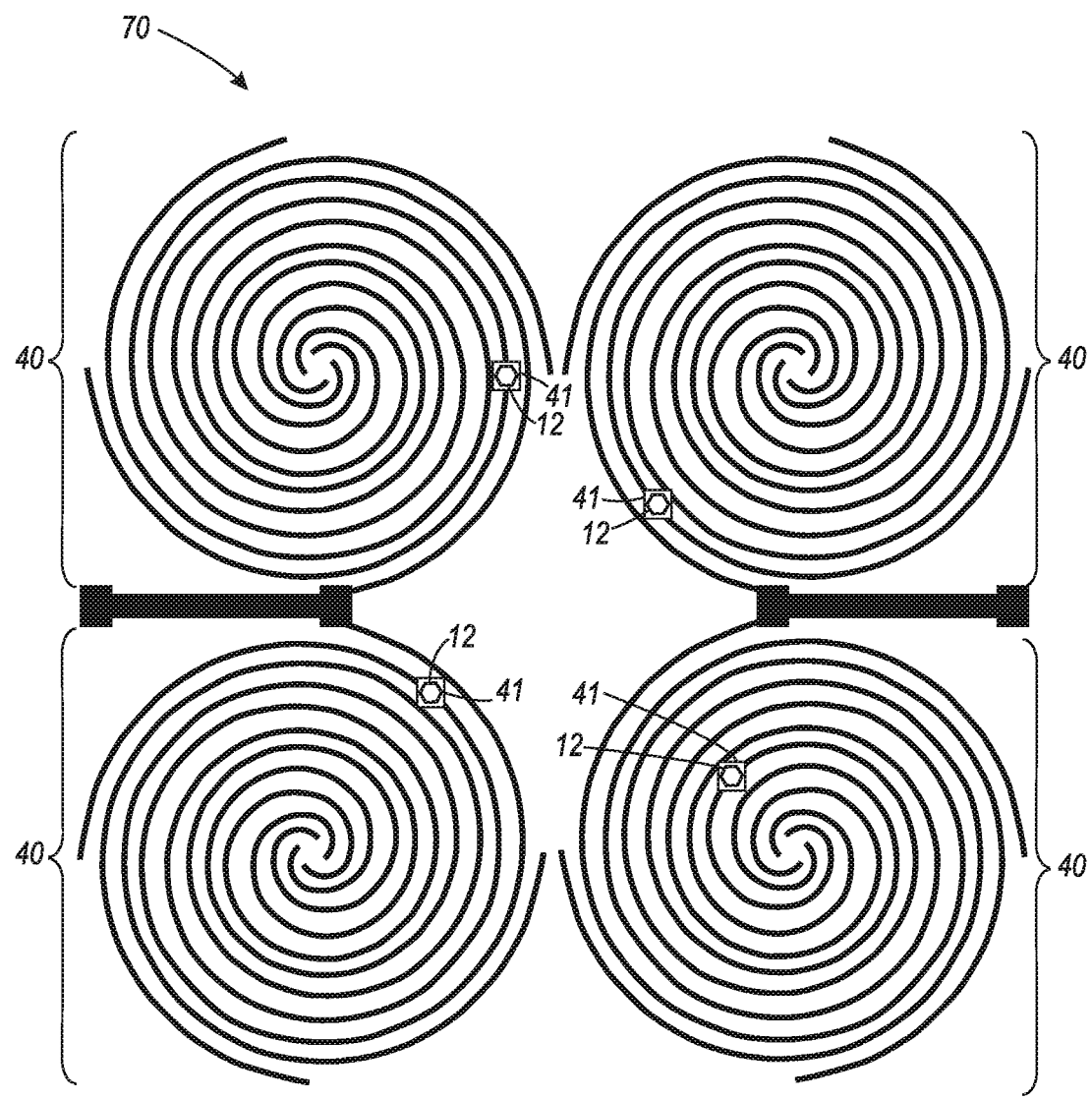
FIG. 6 is diagram showing, by way of example, results of a template matching algorithm.
Figure 7A:
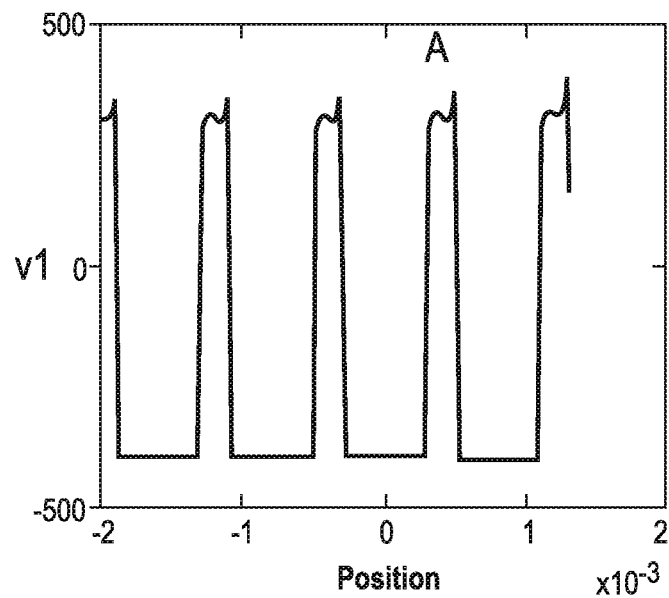
FIGS. 7A-7D are diagrams showing, by way of example, the resulting electrode voltage patterns as function of the micro-object position from solving a sequence of optimization problems of equation (8).
Figure 7B:
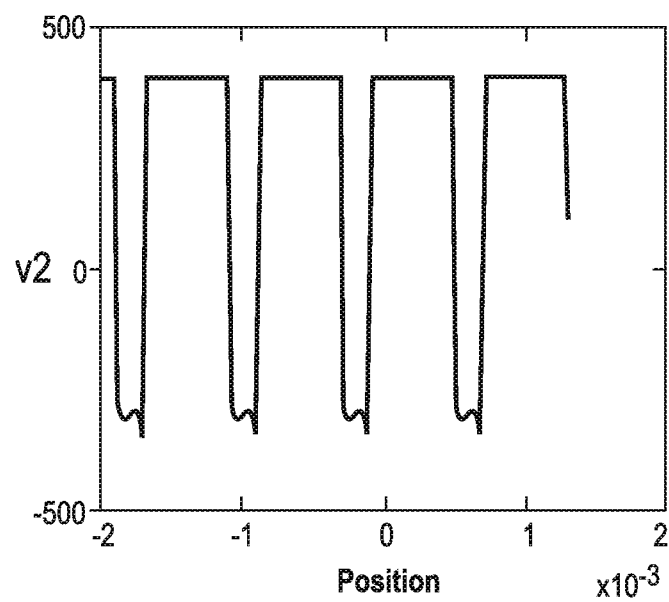
Figure 7C:
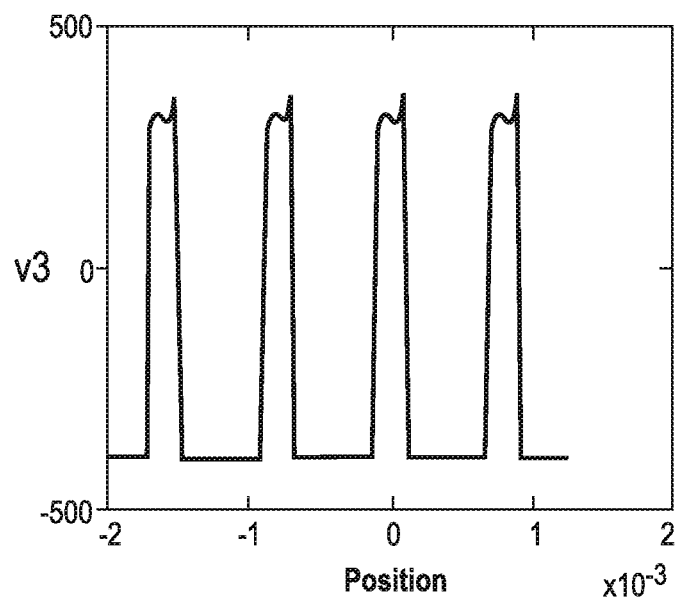
Figure 7D:
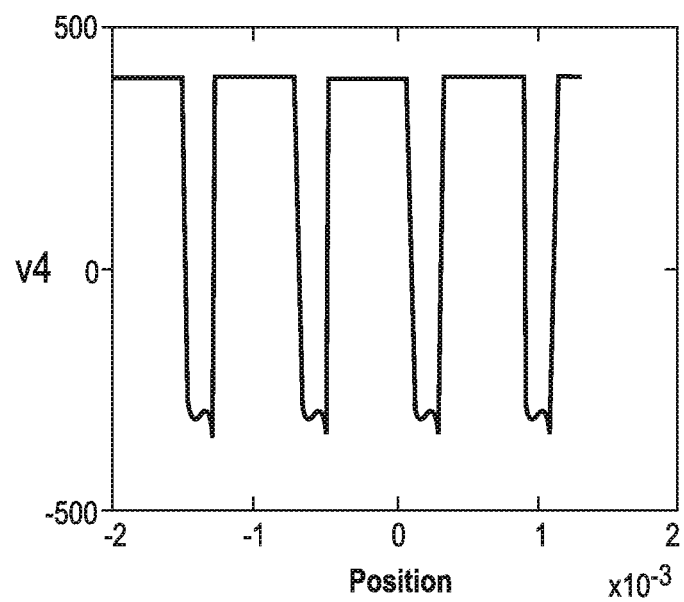

Once the position tracker 25 identifies the connected components, the position tracker runs a template matching algorithm in a small neighborhood around detected connected components. In one embodiment, the neighborhood can be 50×50 pixels, but other sizes of the neighborhood are also possible. The template used in the algorithm is an image of a micro-object 12, either the same micro-object 12 whose position tracked or a similar micro-object 12 (which can be stored in the database 21 (not shown)), and the template matching proceeds to identify the position of the template where there is maximal overlap with the micro-object 12 in $f_k$. The identification results in an accurate estimation of the position 32 (which can be stored in the database 21) corresponding to the center of the detected micro-object 12, an example of which can be seen with reference to FIG. 6. FIG. 6 is diagram 70 showing, by way of example, results of a template matching algorithm. As can be seen with reference to FIG. 6, the data provided by the camera 26 can be analyzed to monitor motion of multiple micro-objects 12 in relation to multiple electrode units 40, with positions. The tracked positions are denoted by rectangles 41 surrounding the micro-objects 12. While spiral electrode units 40 and hexagonal micro-objects 12 are shown, the template matching algorithm can be used by the position tracker 25 for monitoring of a position of micro-objects 12 of other shapes in relation to other numbers of electrode units 40 and electrode units 40 of other shapes.

Returning to FIG. 1, once the positioner tracker 25 determines a position of a micro-object 12 via performing the background extraction algorithm, the morphological opening application, and the template matching algorithm, the position tracker does not have to perform all of the same steps to identity the micro-object 12 in subsequent grayscale images 29 due to the next iteration of the generation of the dielectrophoretic field resulting in a small perturbation (center distances<ε) of in positions of the micro-objects. Accordingly, the position tracker 25 defines a square window 33, which can be stored in the database 21, of side of at least 2ε and runs the template matching algorithm described above within the window 33. In one embodiment, the size of the window 33 can remain the same throughout determinations of multiple positions of the micro-object 12. In a further embodiment, the size of the window 33 can be redefined after one or more position determinations. Performing the template matching algorithm within the window 33, as opposed on an entire image 29, reduces the time necessary to detect the center of the micro-object 12. Table 1 lists experimentally found computation times for the template matching algorithm for various sizes of the windows.

TABLE 1

| Window Size (pixels) | Compute Time (ms) |
| --- | --- |
| 960 × 1280 | 9.25 |
| 500 × 650 | 0.426 |
| 300 × 300 | 0.035 |
| 100 × 100 | 0.025 |

The computing device 20 further executes a signal generator 35 that generates a control scheme 36 for moving a micro-object from a known initial position 37 to a desired position 38. The control scheme includes one or more control signals 39 that are applied to the electrodes 15A-15D via the amplifiers 18 and the converter 19. Each control signal 39 is a command for the electrodes 15A-15D to generate a particular voltage for a particular period of time. The control scheme 36 further includes a predefined amount of time that must pass between the applications of the control signals 39. Thus, the control signals for multiple electrodes 15A-15D in a unit 40 can be simultaneously applied as a series of impulses, as further described below with reference to FIG. 9.

By having positions of the micro-object 12 tracked, the signal generator 35 can generate one or more the signals 39 that would accomplish the desired change in the positions of the micro-objects based on real-time feedback, thus increasing the speed with which the object can be delivered to a desired position. The scheme 36 is generated progressively, with the signals 39 being generated as the micro-object 12 changes position. Thus, the signal generator implements a control policy that is a based on a one-step ahead policy: for each position 32 of the micro-object 12, the signal generator 35 generates a signal 39 that brings the micro-object closer to a desired position 38. Following the generation of the signal 39, the signal generator 35 can apply the control signals 39 by commanding the electrodes 15A-15D to generate the voltages required by the signals 39 via the digital-to-analog converter 19 and the amplifiers 18.

The generation of the signals 39 by the generator 35 utilizes the capacitance-based model 24 that was created as described above. In particular, prior to applying a control signal, the signal generator 35 models the dependence of the voltage generated (and consequently, of the generated forces) by one of the electrodes 15A-15D and a magnitude of a change in the position of a micro-object 12 due to generation of the voltage by one electrode 15, creating a base function 34 describing the dependence. Once the movement of a micro-object needs to be accomplished in real-time, the signal generator 35 leverages the base functions to design the control scheme 36 for moving the micro-object from a starting position 37 towards a desired position. In particular, the generator 35 plugs a current position of the micro-object 12 into the base function 34, outputting the change in the voltage that needs to be produced for one of the electrodes. As further described below, the requisite voltage for the desired change in position for other electrodes, such as the three remaining electrodes of unit 40, can be derived from the voltage for the one electrode based using via translation operations and sign changes. Accordingly, due to not having to perform all of the calculations in real-time and having the preexisting base function 34, the calculation of the control scheme 36 can be significantly accelerated.

As mentioned above, the signal generator 35 derives the base function 34 prior to generating the control signals 39. The signal generator 25 models the dependence of the magnitude of movement and the generated voltage as an optimization problem with both equality and inequality constraints and uses the capacitance-based model 24 in creating the function 34. The optimization problem is in the form of:

$$\min_{v_i} \|x_{ref} - h\dot{x}\|^2 \quad (8)$$

subject to: $\dot{x} = v'\Xi(x_c(k))v - V_{max} \leq v_i \leq V_{max}, i = 1, 2, 3, 4$ where $x_{ref}$ denotes the desired position 37, h is a discrete step size describing the distance that a micro-object 12 moves, $v=[v_1, v_2, v_3, v_4]'$, $x_c(k)$ is the current position of a micro-object 12, and $V_{max}$ is the maximum voltage that can be generated at an electrode 15A-15D. In embodiments where a different number than four electrodes 15A-15D are involved in inducing micro-object 12 movement, v would be adapted to account for the different number of the electrodes 15A-15D. As shown by the equation 8, the voltages that can move a micro-object towards a desired position is subject to two constraints: one constraint is the speed with which the micro-object 12 can move, which is dependent on the capacitance between the electrodes 15A-15D and the micro-object 12, as described above; the second constraint is the magnitude of the voltages that can be generated by the electrodes, which is one of the parameters 22. In one embodiment, $V_{max}$ can be 400 Volts, though other values are also possible.

In effect, the problem of equation (8) maximizes the x-direction of the instantaneous velocity for a given position and under the voltage constraints. The signal generator 35 solves the optimization problem for multiple values of desired position change and obtains the requisite voltages (and consequently the requisite force) that need to be generated by the electrodes 15A-15D to achieve the change. In one embodiment, the signal generator 35 uses an optimization toolbox provided by MATLAB® software developped by MathWorks, Inc. of Natick, Massachussets, to solve a sequence of optimization problems of the form (8) obtain the simulated values. An example of results of such simulations can be seen with reference to FIGS. 7A-7D.

FIGS. 7A-7D are diagrams showing, by way of example, the resulting electrode voltage patterns as function of the micro-object position from solving a sequence of optimization problems of the equation (8). The parameters 22 of the electrodes 15A-15D shown in FIG. 2 are used in the simulation used to create the diagrams. The patterns are a set of voltages generated by each of the electrodes for a pre-defined period of time and a change in the position of the micro-object resulting from the generation of the voltage by that electrode. The patterns were computed by solving equation (8) for a sequence of micro-object 12 positions prior to attempting to move a micro-object 12 modeled by the equation in real-time, thus mapping voltage values to magnitude of induced movements. The initial position of a micro-object 12 is shown to be −2 mm and the desired position 37 is 2 mm. The sequence of electrodes uniformly distributed between −3 mm and 3 mm with a 200 µm spacing between their centers. The electrode voltages repeat every four electrodes. They are spatially periodic.

Figure 8:
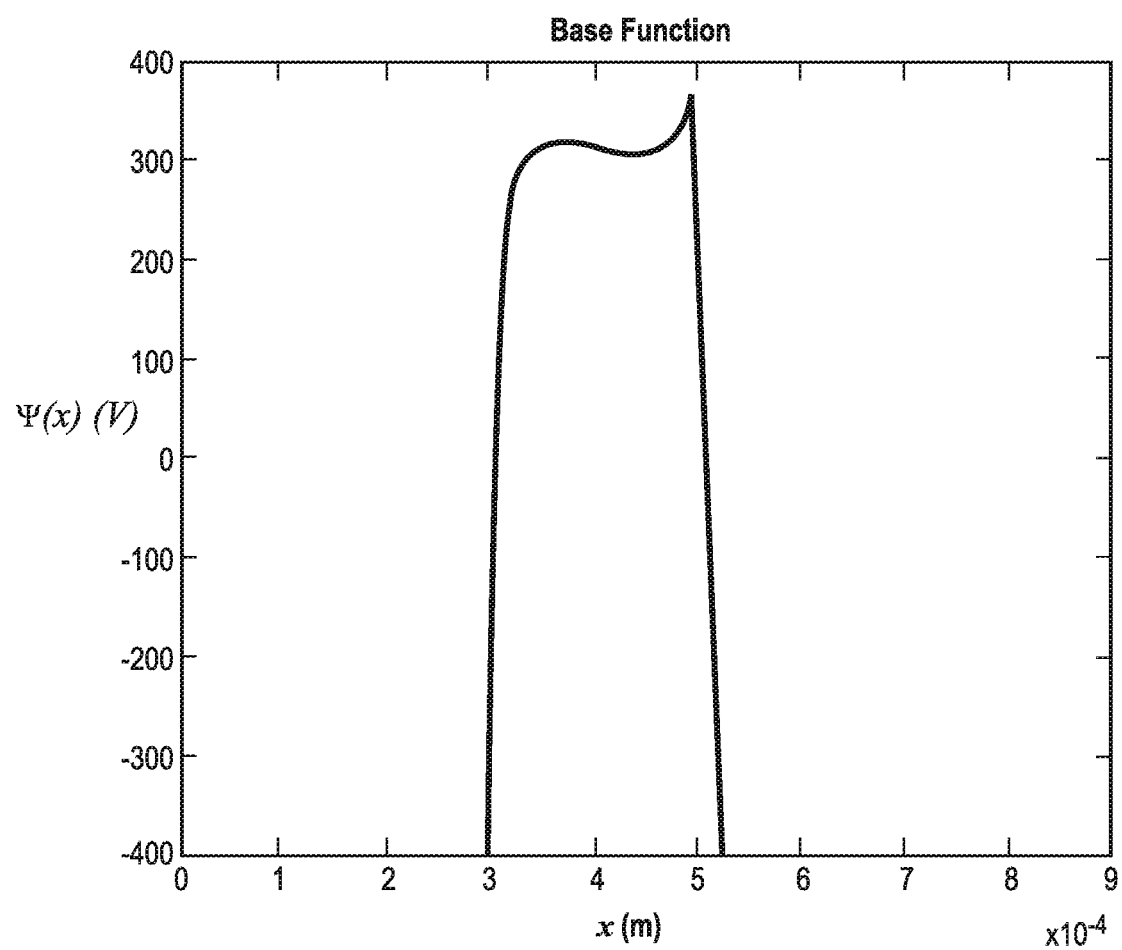
FIG. 8 is a diagram showing, by way of example, a base function describing the dependence of a voltage generated by one electrode and the movement of a micro-object induced by the voltage field generated by that electrode.

Based on the simulated values obtained as solutions to the equation (8), the signal generator 35 generates the base function 34 that describes the dependence of a voltage generated at one electrode 15A-15D and the movement of a micro-object 12 due to the dielectrophoretic field generated by that electrode. FIG. 8 is a diagram 90 showing, by way of example, a base function describing the dependence of a voltage generated by one electrode 15A-15D and the movement of a micro-object 12 induced by the voltage field generated by that electrode.

As mentioned above, there is a spatial periodicity between a position of a micro-object 12 and the control input needed to move the micro-object 12 towards a desired position 38. The signal generator 35 can use the base function 34 and this spatial periodicity to construct the real-time control scheme 36, which includes control signals 39 for generating requisite voltage. Thus, the signal generator 35 maps a position of a micro-object to the control input needed to move the micro-object towards the desired final position as fast as possible. The mappings are based on two properties of the electrode voltages. First, there is periodicity in the electrode voltages as a function of the micro-object 12 position. Thus, the signal generator 35 needs to record the mapping between the position and the control input for one period only. Second, potentials of other electrodes 15A-15D in the unit 40 can be derived from a potential one of the electrodes 15A-15D in the unit 40, via translation operations and sign change. These two properties allow real-time implementation of the micro-object 12 position control.

The following example, described with reference to the electrodes 15A-15D earlier whose voltage patterns were described above with reference to FIGS. 7A-7D, illustrates how the control signals for multiple electrode units can be generated from a voltage derived for one of the electrodes via translation and sign changes. Let $v_1(x)$ denote one of the electrodes 15A-15D voltage as a function of position. As mentioned above $v_1$ is spatially periodic, with a period of X=800 μm, that is $v_1(x)=v_1(x+nX)$, for n∈Z. Moreover, the voltage pattern over one period is given by the base function Ψ: [0,X]→[−400,400], also depicted in FIG. 8.

Hence, $v_1$ is generated according to the rules $$v_1(x)=v_1(x+nX), v_1(x)=\Psi(x), \qquad (9)$$

with n∈Z and x∈[0, X). By analyzing the correlation between $v_1$ and the rest of the voltages for the remaining 3 electrodes, the last three electrodes voltages (denoted $v_2$, $v_3$, and $v_4$) can be expressed as $$v_2(x)=-v_1(x+\delta), v_3(x)=v_1(x+2\delta), v_4(x)=-v_1(x-\delta) \qquad (10)$$

where δ=200 μm in one embodiment. The value of δ represents the distance between centers of electrodes 15A-15D Therefore, to move the micro-object 12 in the positive direction a position dependent control input can be generated using only the base function 34, denoted as Ψ(x), and the rules of equations (9)-(10). Similar rules in terms of Ψ(x) can be determined to move the micro-object 12 in the negative direction.

Figure 9:
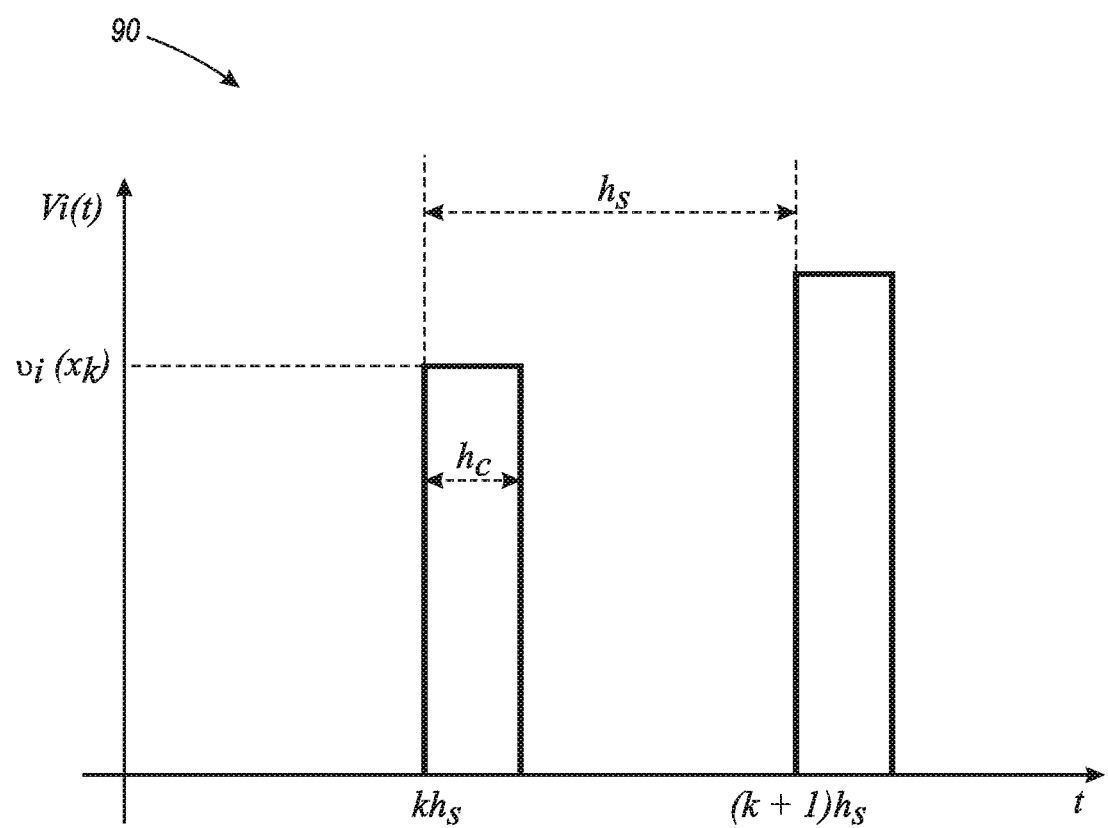
FIG. 9 is a diagram showing, by way of example, an impulse-based real-time control scheme.
Figure 10A:
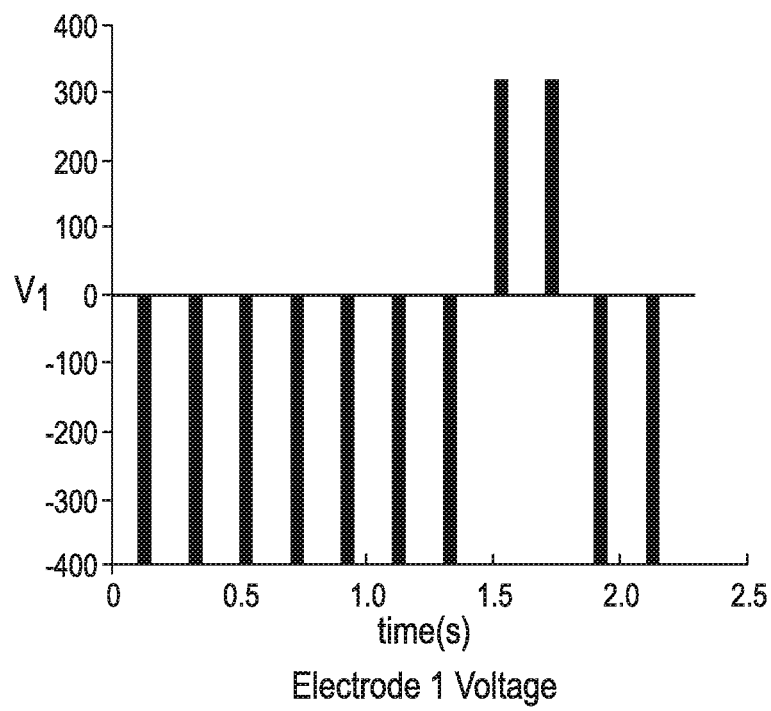
FIGS. 10A-10D are diagrams showing, by way of example, a control scheme for using the control unit of FIG. 2 to move a micro-object 1000 μm.
Figure 10B:
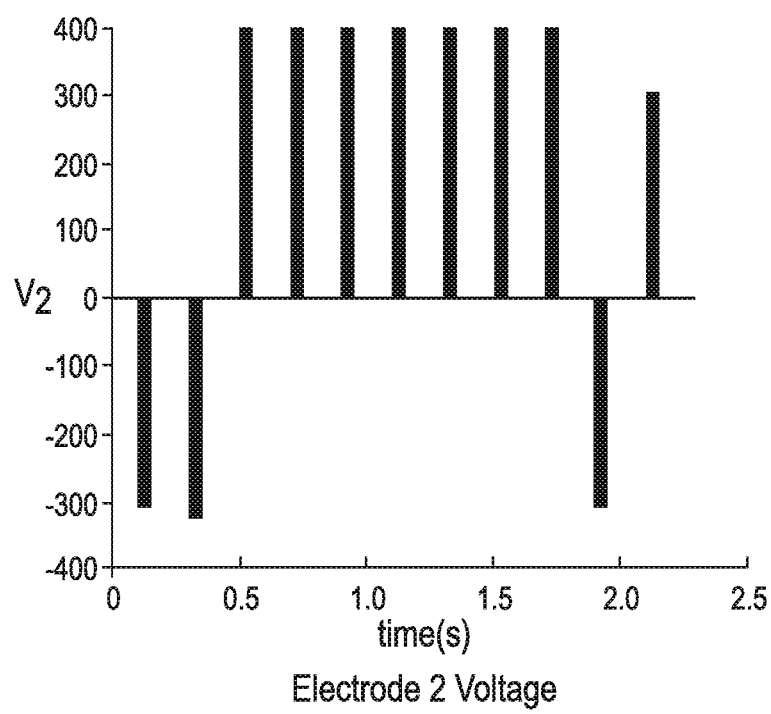
Figure 10C:
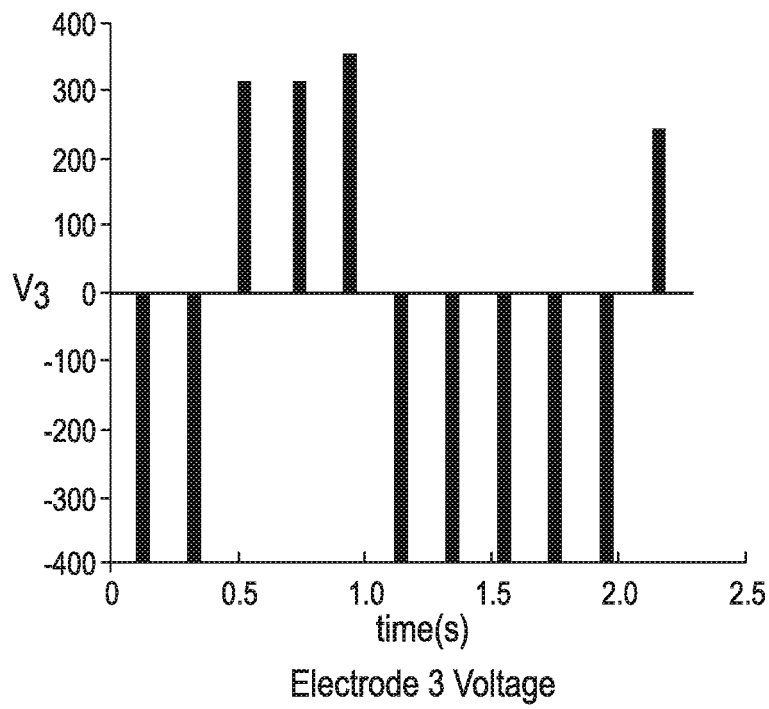
Figure 10D:
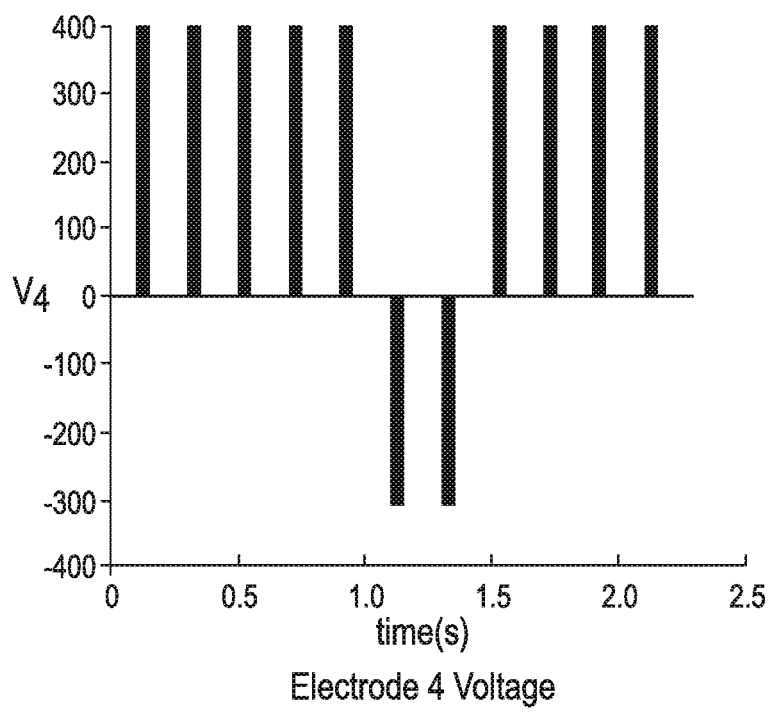

Generally, a significant amount of time may be necessary to obtain an accurate position estimate for a micro-object 12, and the micro-object 12 must remain stationary during the estimation, thus slowing down the micro-object assembly. To cope with these challenges, the signal generator 35 uses an impulse control policy where a short control impulse of a predefined length based on a current known position is applied, followed by a waiting period to allow for the next position estimate to stabilize. More formally, let $h_s$ be the time period at which the micro-object position is updated, and let $V_i(t)$ be the control signals applied to the electrodes, with i=1, 2, 3, 4. If a different number of electrodes is used for movement of the micro-object, i would change accordingly. FIG. 9 is a diagram showing, by way of example, an impulse-based real-time control scheme 36. The impulse-based real time control scheme, pictorially depicted in FIG. 9, is defined by small $$V_i(t) = \begin{cases} v_i(x_k) & t \in [kh_s, kh_s + h_c) \\ 0 & t \in t \in [kh_s + h_c, (k+1)h_s) \end{cases} \qquad (11)$$

where $x_k$ is the position of the micro-object at time $kh_s$ and $h_c$ is the duration of the control impulse. After the application of the control impulse, the micro-object 12 can be assumed stationary due to its negligible mass and the viscous drag. Hence, the tracking stabilization time is given by $\tau = h_s - h_c$. In a further embodiment, the signal generator 35 generates signals 38 to be applied as consecutive impulses based on the current position of the micro-object. Still other ways to obtain the voltages necessary for inducing a desired movement of the micro-particle are possible.

Figure 11:
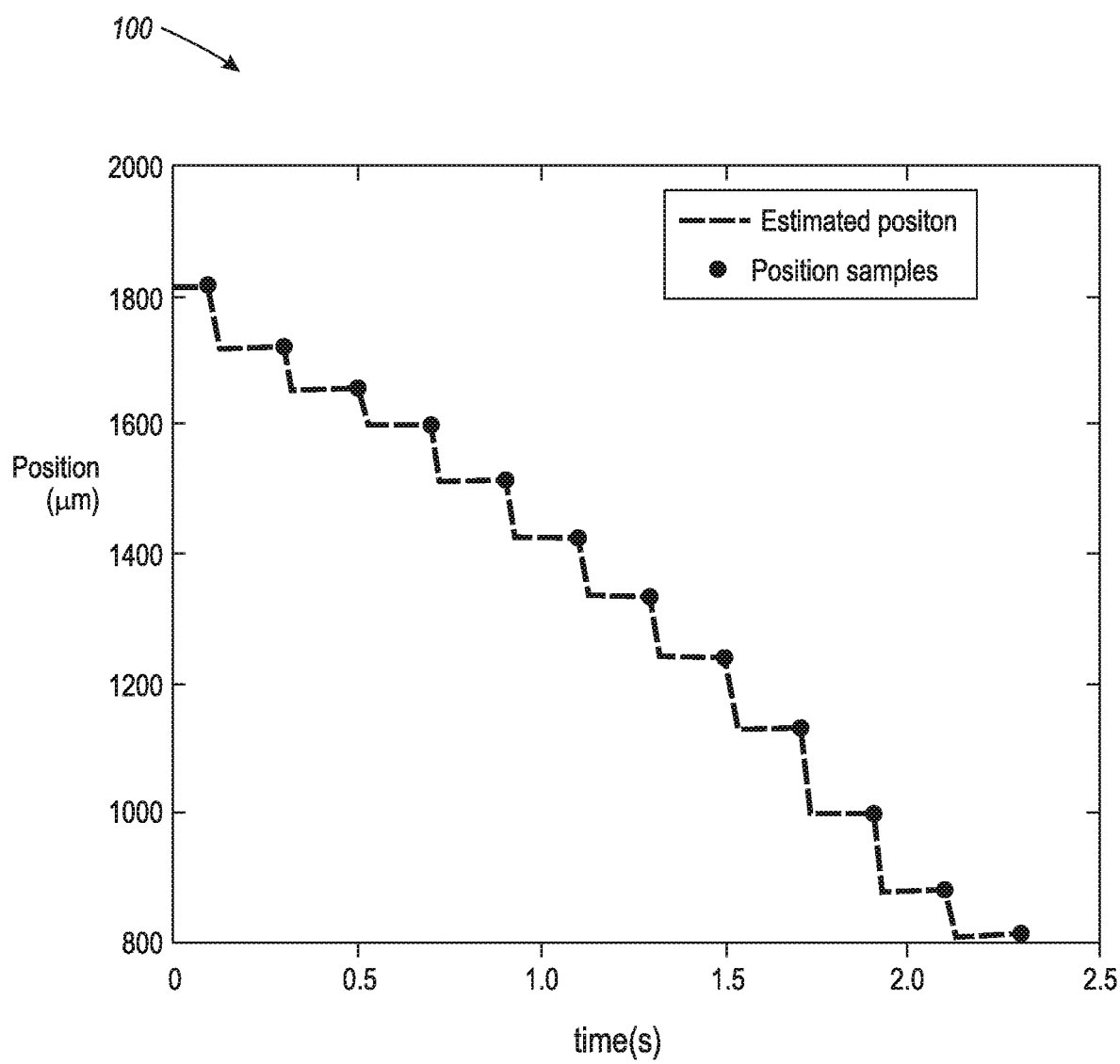
FIG. 11 is a diagram showing, by way of example, a result of application of the control scheme of FIG. 10.

As described above, the voltages generated by multiple electrodes can affect a single micro-object that is proximate to those electrodes 15, and a control scheme 36 can account for the voltages generated by the multiple electrodes. FIGS. 10A-10D are diagrams showing, by way of example, a control scheme 36 for using the control unit 40 of FIG. 2 to move a micro-object 1000 μm. The control scheme 36 in FIGS. 10A-10D is applied to a control unit 40 that includes four electrodes 15, with the micro-object being a silicon chiplet of 300 μm×200 μm×50 μm dimensions. When implemented, the control scheme results in stepwise movements of the micro-object, as shown in FIG. 11. FIG. 11 is a diagram 100 showing, by way of example, the movement of a micro-object 12 as a result of application of control scheme of FIG. 10. The position of the micro-object was tracked every 10 miliseconds. The dashed lines represent the estimated positions of the micro-object 12, while the solid dots show the samples of the micro-object positions 12.

While the at least one computing device 20 is shown as a server, other types of computer devices are possible, such desktop computers, laptop computers, mobile devices such as tablets and smartphones, though still other types of computing devices 20 are possible. The computing device 20 can include one or more modules for carrying out the embodiments disclosed herein. The modules can be implemented as a computer program or procedure written as source code in a conventional programming language and is presented for execution by the central processing unit or a graphics processing unit (GPU) as object or byte code. Alternatively, the modules could also be implemented in hardware, either as integrated circuitry or burned into read-only memory components, and each of the servers can act as a specialized computer. For instance, when the modules are implemented as hardware, that particular hardware is specialized to perform the computations and communication described above and other computers cannot be used. Additionally, when the modules are burned into read-only memory components, the computer storing the read-only memory becomes specialized to perform the operations described above that other computers cannot. The various implementations of the source code and object and byte codes can be held on a computer-readable storage medium, such as a floppy disk, hard drive, digital video disk (DVD), random access memory (RAM), read-only memory (ROM) and similar storage mediums. Other types of modules and module functions are possible, as well as other physical hardware components. For example, the computing device 20 can include other components found in programmable computing devices, such as input/output ports, network interfaces, and non-volatile storage, although other components are possible. In the embodiment the computing device 20 is a server, the server can also be cloud-based or be dedicated servers. The computing device 20 can be connected to the converter 19 and the camera 26 either directly or via a network, including an Internetwork such as the Internet.

In a further embodiment, the computing device could further control the assembly of multiple micro-objects at the same time by implementing the algorithms described above and below in parallel using the GPU.

Figure 12:
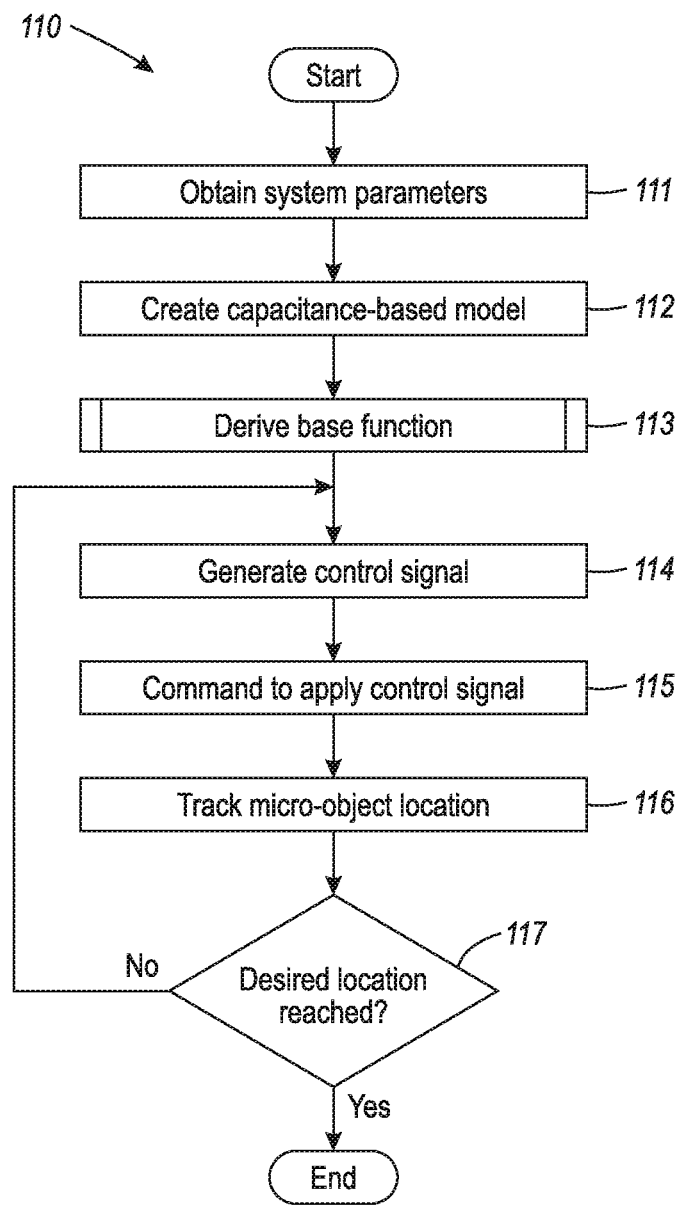
FIG. 12 is a flow diagram showing a method for scalable real-time micro-object position control with the aid of a digital computer.

By deriving the capacitance-based model and the base function prior to controlling a micro-assembly, the speed with which the assembly can be performed in real-time can be greatly accelated. FIG. 12 is a flow diagram showing a method 110 for scalable real-time micro-object position control with the aid of a digital computer. The method 110 can be implemented using the system 10 of FIG. 1, though other implementations are also possible. Parameters for the micro-objects positioning assembly are obtained (step 111). A capacitance-based model of the interaction between the electric fields generated by one or more electrodes and a micro-object is created as described above with reference to FIG. 1 using the parameters (step 112). In a further embodiment, a parameter of the interaction between an electrode 15A-15D and the micro-object 12 can be modeled and used during subsequent calculations.

Figure 13:
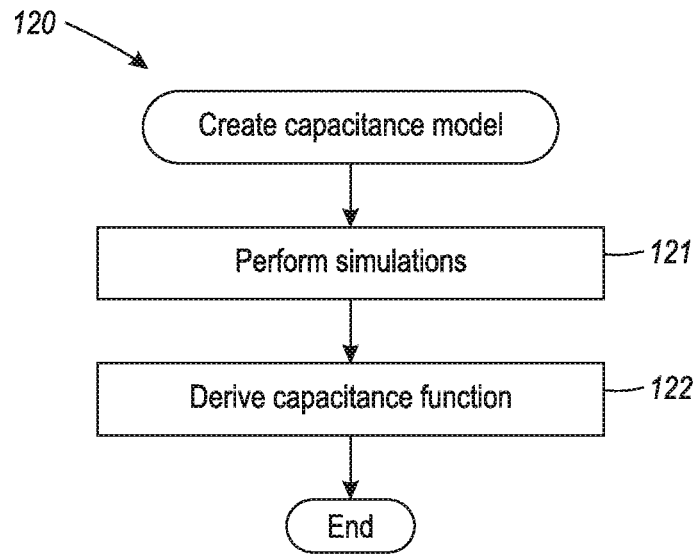
FIG. 13 is a flow diagram describing a routine for generating the capacitance-based model for use in the method of FIG. 12 in accordance with one embodiment.

A base function for generating voltage patterns is derived using the capacitance-based model, as further described above with reference to FIG. 1 and below with reference to FIG. 13 below (step 113). Control signals for moving the micro-object towards a desired position are generated using the base function and a starting position (step 114). As described above with reference to FIG. 1, a voltage that needs to be applied for one of the electrodes is first generated by entering the current position of the micro-object (which is the starting position of the micro-object during a first iteration of step 114 during an execution of the method 110) into the base function and obtaining the requisite voltage as the output of the base function. The voltages for one or more additional electrodes based on the voltages for the one electrode through translation operations and sign changes as described above with reference to FIG. 1. The generated control signals are applied by commanding implementation of the calculated voltages for a period of time defined by the control signals on the electrodes (step 115). If more than one iteration of step 114 are performed, the starting position of the micro-object is updated to reflect the tracking described below in step 116.

Figure 14:
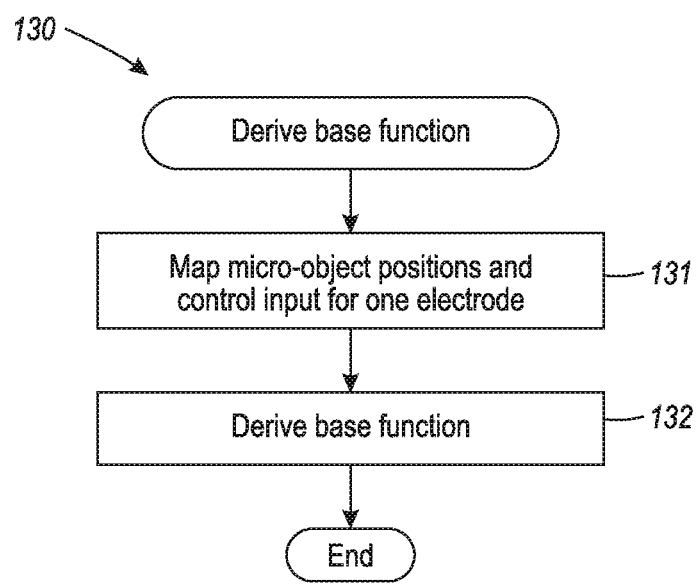
FIG. 14 is a flow diagram showing a routine for deriving a base function for control signal generation for use in the method of FIG. 12 in accordance with one embodiment.

A position of the micro-object is tracked (step 116), as further described above with reference to FIG. 1 and below with reference to FIG. 14. If following the generation of the voltage by one or more electrodes the micro-object has reached the desired position (step 117), the method 110 ends. If the micro-object has not reached the desired position (step 117), the method 110 returns to step 114, where a further control signal is generated to allow for another movement of the micro-object 12.

Creating the capacitance-based model allows to account for the potential energy of the micro-object. FIG. 13 is a flow diagram describing a routine 120 for generating the capacitance-based model for use in the method 110 of FIG. 12, in accordance with one embodiment. A capacitance between the micro-object 12 and each of the electrodes involved in moving the micro-object is simulated at a plurality of distances as described above with reference to FIG. 1 (step 121). A function included in the model 24 showing a relationship of between the position of the micro-object 12 and the electrodes 15A-15D is derived based on the estimated results (step 122), ending the routine 120.

Deriving the base function that is used for determining the amount of voltage that needs to be generated by the electrodes in advance of having to apply the control signals allows to significantly speed-up the calculations necessary for the signal generation. FIG. 14 is a flow diagram showing a routine 130 for deriving a base function for control signal generation for use in the method 110 of FIG. 12 in accordance with one embodiment. Simulations are performed to obtain a plurality of values for voltages generated by an electrode for a predefined period of time corresponding to a certain amount of movements caused by the generation of the particular voltage values, as described above with reference to FIG. 1 (step 131). A base function that describes the relationship between the voltage generated at an electrode and the amount of movement of a micro-object due to the generated voltage is derived based on the plurality of values obtained due to the simulation, as described in detail above with reference to FIG. 1 (step 132), ending the routine 130.

Figure 15:
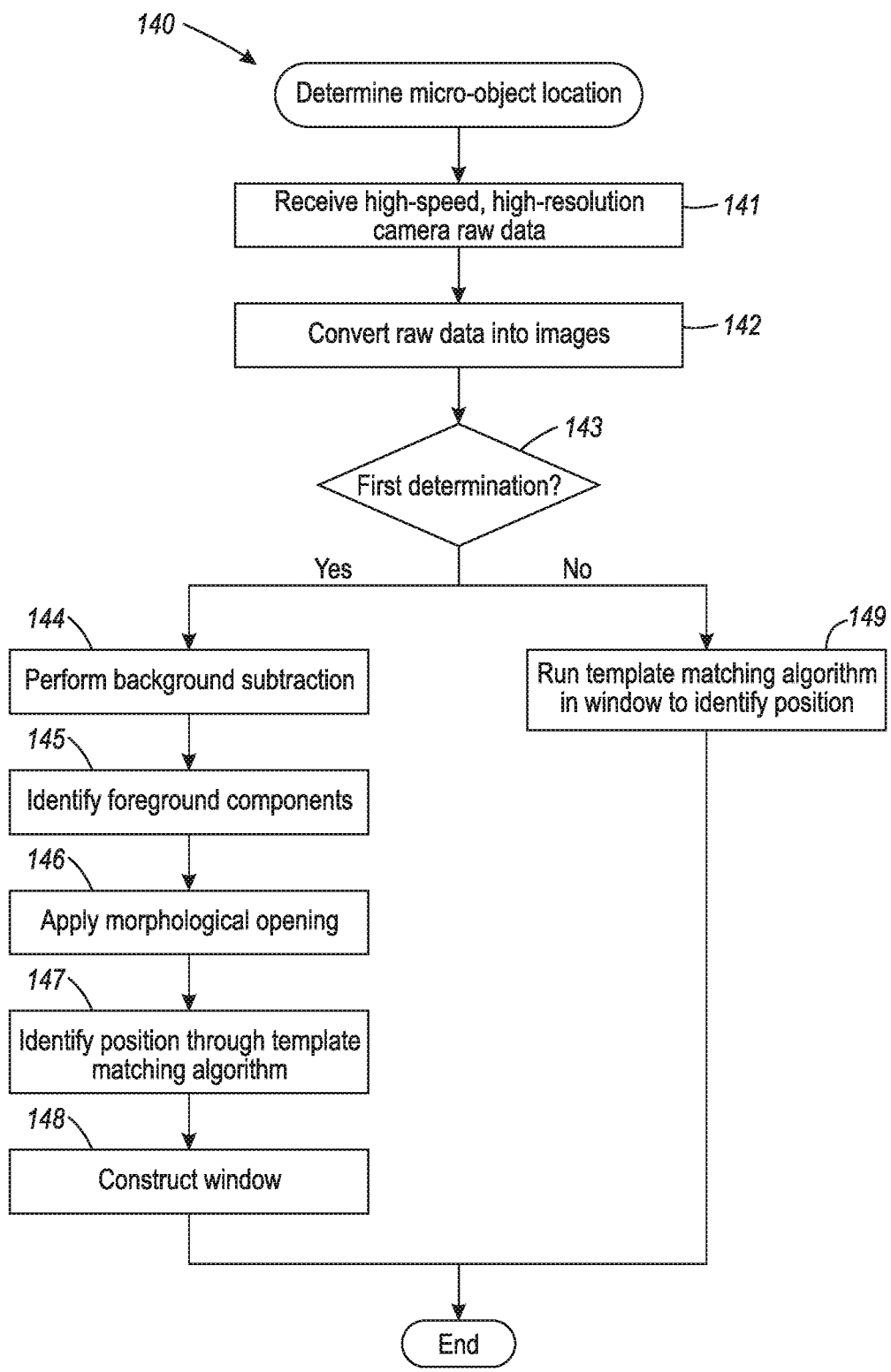
FIG. 15 is a flow diagram showing a routine for tracking a position of a micro-object for use in the method of FIG. 12 in accordance with one embodiment.

Monitoring the position of a micro-object 12 in between applications of control signals allows to obtain feedback to the control signals and implement corrections to the control scheme, thus improving the preciseness and the speed with which a micro-object is placed into a desired position. FIG. 15 is a flow diagram showing a routine 140 for tracking a position of a micro-object for use in the method 110 of FIG. 12 in accordance with one embodiment. Raw data from monitoring of a micro-object 12 in relation to one or more electrodes 15A-15D is received from a high-speed, high-resolution camera (step 141). During the first iteration of step 141, the raw data includes visual data captured before and after an application of a control signal to the electrodes for a first time during an implementation of the method 110. The raw data is processed by a frame grabber and converted into at least one image (step 142). If the routine 140 is performed for the first time during the implementation of the method 140 (step 143), at least one background subtraction algorithm is performed on several images that were derived from the raw data captured before the first application of the control signal to stabilize parameters in the mixture model that can be used to differentiate background elements from foreground elements (step 144). Images derived from raw data captured after an application of a control signal are analyzed and all moving objects, when compared to the digital images based on the raw data captured before the implementation of a control signal, are identified as foreground components, with non-moving objects being identified as background components (step 145). A morphological opening is applied to the identified foreground component, as described above with reference to FIG. 1, to foreground components that are smaller than the size of the micro-object 12 (step 146). A template matching algorithm that uses an image of the micro-object as comparison is ran around the identified foreground components that were identified to identify the micro-object 12 in the image and thus determine the position of the micro-object 12 (and additional micro-objects 12 if present) (step 147). A window is defined around the identified micro-objects for use in subsequent tracking of the micro-object position 12, as described in detail above with reference to FIG. 1, ending the routine 140.

If the routine 140 is not performed for the first time during a particular execution of the method 110, a template matching algorithm using the image of the micro-object as a template is performed within the window previously constructed in step 147 (step 148), identifying the current position of the micro-object and ending the routine. Optionally, the window may be redefined after one or more additional iterations of step 148 (not shown).

While the invention has been particularly shown and described as referenced to the embodiments thereof, those skilled in the art will understand that the foregoing and other changes in form and detail may be made therein without departing from the spirit and scope of the invention.

What is claimed is:

1. A system for scalable real-time micro-object position control with the aid of a digital computer, comprising:
at least one processor configured to execute computer-executable code and further configured to:
obtain one or more parameters of a system for positioning of at least one micro-object, the system comprising a plurality of electrodes, the electrodes configured to induce a movement of the micro-object when the micro-object is suspended in a fluid proximate to the electrodes upon a generation of one or more forces by the electrodes;
model a capacitance of an interaction between each of the electrodes and the micro-object as a function of a distance between that electrode and the micro-object using the system parameters;
obtain a position of the micro-object within the fluid;

obtain using the modeled capacitance a further function describing a relationship between the forces generated by one of the electrodes for a predefined period of time and an extent of the movement induced by the forces generated by the one electrode, comprising:
  map a plurality of values for the one or more forces generated by the one electrode to the extent of the movement of the micro-object induced by the generation of each of the voltage values; and
  derive the further function from the mappings; and
generate a control signal for each of the electrodes, the control signal comprising a command to generate one or more of the forces for the predefined period of time by that electrode, using the obtained position, the further function, and a desired location of the micro-object.

2. A system according to claim 1, wherein the electrodes are spiral electrodes and are comprised in an electrode unit.

3. A system according to claim 1, wherein the electrodes are periodically spaced.

4. A system according to claim 1, the at least one processor further configured to:
perform a plurality of simulations of the interaction parameters at a plurality of values of the distance, wherein the modeling is done based on the simulations.

5. A system according to claim 1, the at least one processor further configured to:
apply the control signals to the electrodes, wherein the electrodes generate the one or more forces commanded by the control signals upon the application and induce the movement of the micro-object;
identify a further position of the micro-object following the application of the control signals to the electrodes; and
generate further control signals for the electrodes using the interaction parameter, the further position of the micro-object, and the desired position of the micro-object following the application.

6. A system according to claim 5, the at least one processor further configured to:
receive raw data captured by a high-speed, high-resolution camera monitoring the micro-object, the raw data having been captured before and after the application of the control signals;
convert the raw data into a plurality of images using a frame grabber;
perform background extraction on the images converted from the raw data captured before the application of the control signals;
identify foreground components in at least one of the images converted from the raw data captured after the application of the signal using a result of the background extraction;
identify the foreground components whose size is greater than or equals to a predefined size; and
perform a template matching algorithm in a neighborhood associated with the foreground components to identify the position of the micro-object.

7. A system according to claim 5, the at least one processor further configured to:
apply a morphological opening to the foreground components to identify the foreground components whose size is greater than or equal to the predefined size.

8. A system according to claim 5, the at least one processor further configured to:
define a window around the identified position,
wherein the template matching algorithm is run in a neighborhood defined by the window to determine a subsequent position of the micro-object.

9. A system according to claim 1, the at least one processor further configured to:
perform a plurality of simulations to obtain the mappings.

10. A method for scalable real-time micro-object position control with the aid of a digital computer, comprising the steps of:
obtaining one or more parameters of a system for positioning of at least one micro-object, the system comprising a plurality of electrodes, the electrodes configured to induce a movement of the micro-object when the micro-object is suspended in a fluid proximate to the electrodes upon a generation of one or more forces by the electrodes;
modeling a capacitance of an interaction between each of the electrodes and the micro-object as a function of a distance between a location of that electrode and a location of the micro-object using the system parameters;
obtaining a position of the micro-object within the fluid;
obtaining using the modeled capacitance a further function describing a relationship between the forces generated at one of the electrodes for a predefined period of time and an extent of the movement induced by the forces generated by the one electrode, comprising:
  mapping a plurality of values for the one or more forces generated by the one electrode to the extent of the movement of the micro-object induced by the generation of each of the voltage values; and
  deriving the further function from the mappings; and
generating a control signal for each of the electrodes, the control signal comprising a command to generate one or more of the forces for the predefined period of time by that electrode, using the obtained position, the further function, and a desired location of the micro-object,
wherein the steps are performed by a computer.

11. A method according to claim 10, wherein the electrodes are spiral electrodes and are comprised in an electrode unit.

12. A method according to claim 10, wherein the electrodes are periodically spaced.

13. A method according to claim 10, further comprising:
performing a plurality of simulations of the interaction parameters at a plurality of values of the distance, wherein the modeling is done based on the simulations.

14. A method according to claim 10, further comprising:
applying the control signals to the electrodes, wherein the electrodes generate the one or more forces commanded by the control signals upon the application and induce the movement of the micro-object;
identifying a further position of the micro-object following the application of the control signals to the electrodes; and
generating further control signals for the electrodes using the interaction parameter, the further position of the micro-object, and the desired position of the micro-object following the application.

15. A method according to claim 14, further comprising:
receiving raw data captured by a high-speed, high-resolution camera monitoring the micro-object, the raw data having been captured before and after the application of the control signals;
converting the raw data into a plurality of images using a frame grabber;

performing background extraction on the images converted from the raw data captured before the application of the control signals;

identifying foreground components in at least one of the images converted from the raw data captured after the application of the signal using a result of the background extraction;

identifying the foreground components whose size is greater than or equals to a predefined size; and performing a template matching algorithm in a neighborhood associated with the foreground components to identify the position of the micro-object.

16. A method according to claim 15, further comprising:

applying a morphological opening to the foreground components to identify the foreground components whose size is greater than or equal to the predefined size.

17. A method according to claim 15, further comprising:

defining a window around the identified position, wherein the template matching algorithm is run in a neighborhood defined by the window to determine a subsequent position of the micro-object.

18. A method according to claim 10, comprising:

performing a plurality of simulations to obtain the mappings.

* * * * *